United States Patent
Kuwahara et al.

(10) Patent No.: US 7,725,078 B2
(45) Date of Patent: May 25, 2010

(54) WIRELESS COMMUNICATION SYSTEM FOR COMMUNICATION AMONG A PLURALITY OF MOBILE GAME APPARATUSES THAT HAVE DIFFERING PRIORITIES

(75) Inventors: Masato Kuwahara, Kyoto (JP); Masashi Seiki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 465 days.

(21) Appl. No.: 11/806,735

(22) Filed: Jun. 4, 2007

(65) Prior Publication Data
US 2008/0003951 A1  Jan. 3, 2008

(30) Foreign Application Priority Data
Jun. 28, 2006  (JP) .............................. 2006-178564

(51) Int. Cl.
*H04B 7/00*  (2006.01)
(52) U.S. Cl. ........................................ 455/41.3; 463/39
(58) Field of Classification Search ................ 455/41.3, 455/73; 463/39
See application file for complete search history.

(56) References Cited

FOREIGN PATENT DOCUMENTS

| EP | 1 457 239 | 9/2004 |
|---|---|---|
| GB | 2 386 501 | 9/2003 |
| JP | 2001-009166 | 1/2001 |
| JP | 2005-103151 | 4/2005 |

*Primary Examiner*—Nay A Maung
*Assistant Examiner*—Angelica M Perez
(74) *Attorney, Agent, or Firm*—Nixon & Vanderhye P.C.

(57) ABSTRACT

A service providing apparatus transmits, at a short distance, priority control data which indicates that the priority level of a short distance wireless communication of itself for providing service data is higher than the priority level of a short distance wireless communication among mobile game apparatuses. A mobile game apparatus transmits or receives a communication request to set another mobile game apparatus as a counterpart of the short distance wireless communication. The mobile game apparatus also receives service data from the service providing apparatus. The mobile game apparatus attempts to receive priority control data, and when receiving the priority control data, prohibits the short distance wireless communication with other mobile game apparatuses.

27 Claims, 12 Drawing Sheets

F I G. 3
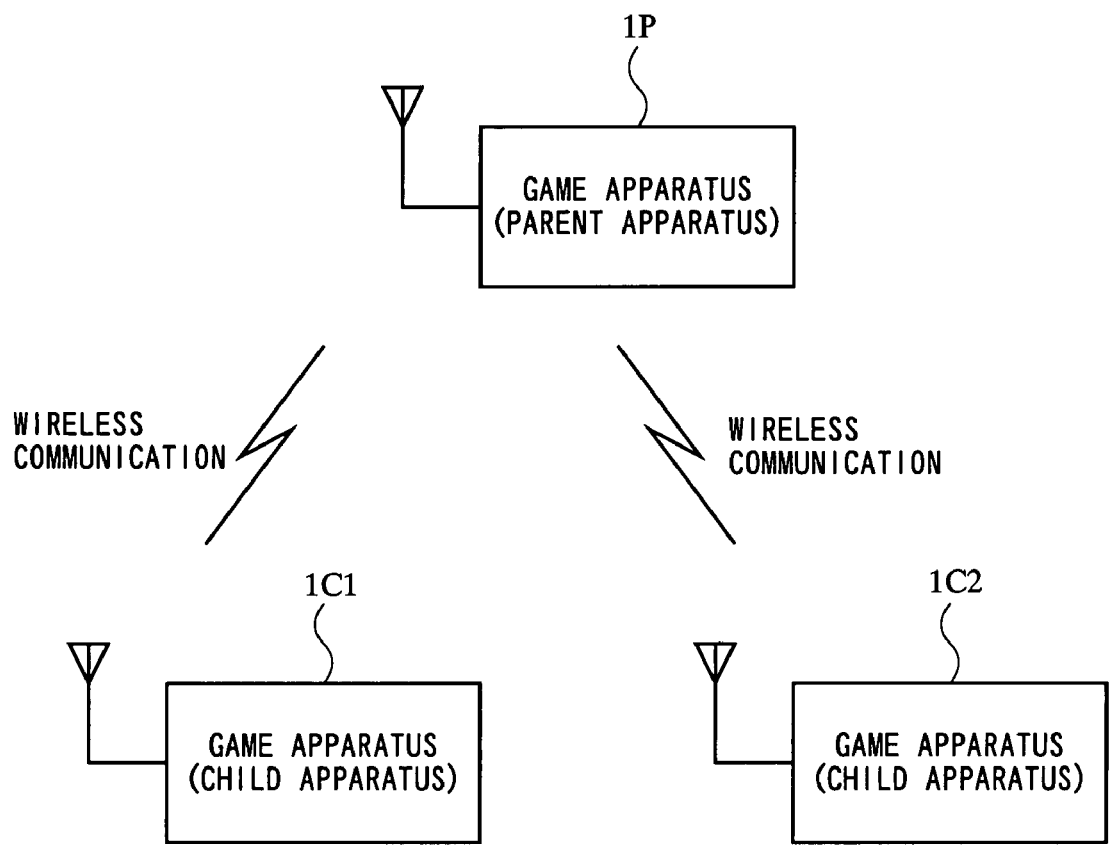

F I G. 4
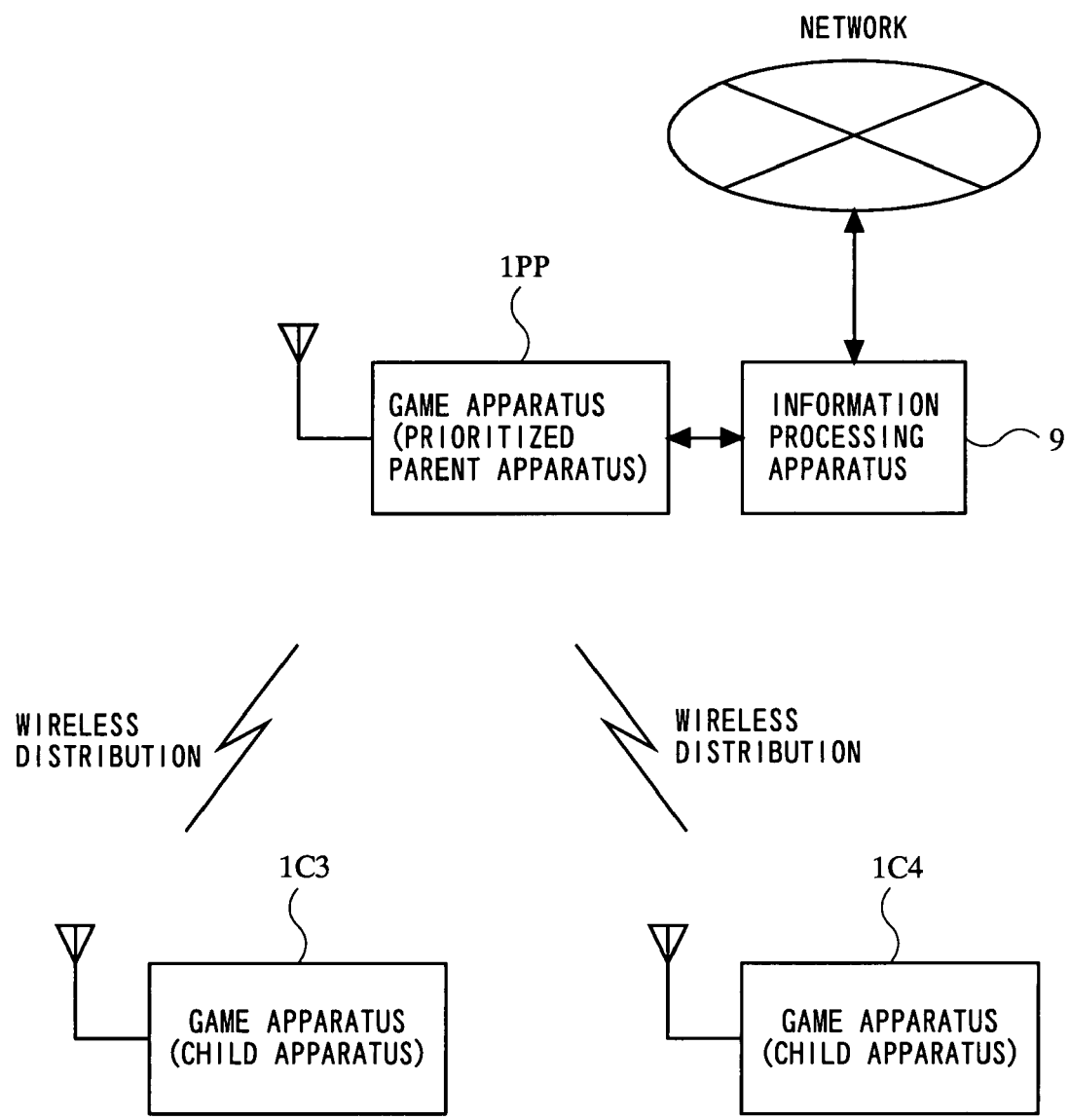

FIG. 6

PARENT APPARATUS BEACON FRAME

| F_TYP | TRANSMITTER ID | GSN | PRIORITY LEVEL | RE-SCAN CYCLE |
|---|---|---|---|---|

FIG. 7

COMMUNICATION REQUEST FRAME

| F_TYP | ADDRESSEE ID | TRANSMITTER ID |
|---|---|---|

FIG. 8

COMMUNICATION PERMISSION FRAME

| F_TYP | ADDRESSEE ID | TRANSMITTER ID | RESULT | GROUP INFORMATION |
|---|---|---|---|---|

FIG. 9

DATA FRAME

| F_TYP | ADDRESSEE ID | TRANSMITTER ID | DATA |
|---|---|---|---|

F I G. 1 0

| Ch | PARENT APPARATUS ID | PLV | ChLV | RE-SCAN CYCLE | PREVIOUS SCAN TIME |
|---|---|---|---|---|---|
| 1 | P1 | 0 | 0 | 5 min. | 15:10 |
| | P2 | 0 | | | |
| | P3 | 0 | | | |
| | ⋮ | ⋮ | | | |
| 7 | P6 | 0 | 1 | 1 hr. | 15:00 |
| | P7 | 1 | | | |
| | P8 | 0 | | | |
| | ⋮ | ⋮ | | | |
| 13 | PP1 | 3 | 3 | NO RE-SCAN | 13:30 |

WIRELESS COMMUNICATION SYSTEM FOR COMMUNICATION AMONG A PLURALITY OF MOBILE GAME APPARATUSES THAT HAVE DIFFERING PRIORITIES

CROSS REFERENCE TO RELATED APPLICATION

The disclosure of Japanese Patent Application No. 2006-178564, filed on Jun. 28, 2006, is incorporated herein by reference.

TECHNICAL FIELD

The exemplary embodiments disclosed herein relate to a wireless communication system, and more specifically to a wireless communication system for allowing a wireless communication between a mobile game apparatus and a service providing apparatus or a wireless communication system for allowing a wireless communication among a plurality of mobile game apparatuses.

BACKGROUND AND SUMMARY

Conventionally, as disclosed in, for example, Japanese Laid-Open Patent Publication No. 2001-009166 (hereinafter, referred to as "patent document 1") and Japanese Laid-Open Patent Publication No. 2005-103151 (hereinafter, referred to as "patent document 2"), there is a technology for allowing a plurality of apparatuses to wirelessly communicate with each other for playing a game or for downloading a game program. For example, a mobile wireless network game apparatus disclosed in patent document 1 can wirelessly communicate with another such game apparatus to play a communication game. A network game system disclosed in patent document 2 allows a mobile telephone terminal to download a game program from a server, or allows a plurality of mobile telephone terminals to play a communication game.

When a plurality of wireless communications influence each other; for example, when a plurality of wireless communications are performed in the same frequency band or in frequency bands influencing each other, a wireless communication for distributing a game program or data to a game apparatus is crossed, or influenced in other ways, with a wireless communication for allowing a plurality of game apparatuses to play a communication game. As a result, the communications are made difficult. With the technology disclosed in patent document 1 or 2, when, for example, there are a wireless communication for distributing a game program or data to a game apparatus from a server, and also a wireless communication for allowing users to play a communication game in the same frequency band, the wireless communication for the distribution may be made difficult.

Especially in a game show venue, a store or the like, a game program or data is occasionally distributed to game apparatuses of users wirelessly. At such a site, a great number of users play a communication game with their game apparatuses using the same frequency band as the wireless distribution. In such a case, the wireless communication for the distribution and the wireless communication for the game influence each other. As a result, the distribution of the game program or the like may be made difficult by the wireless communication for the game.

Even when the wireless communication for distributing the game program is not performed, if a communication game having a higher priority level and a communication game having a lower priority level are played in the same frequency band or in frequency bands influencing each other, the wireless communication for the communication game having the higher priority level may be made difficult because the communications are crossed with each other.

Therefore, a feature of certain exemplary embodiments is to solve at least one of the problems described above and thus provide a wireless communication system capable of performing a wireless communication with priority.

Certain exemplary embodiments have the following aspects to attain the object mentioned above. The reference numerals, step numbers (each step number is represented with "S" and the number) and the like in parentheses in this section of the specification indicate the correspondence with the exemplary embodiments described later and are not intended to be limiting.

A first aspect of certain exemplary embodiments is directed to a wireless communication system including a plurality of mobile game apparatuses (1) for wirelessly communicating with each other at a short distance and a service providing apparatus (1) for wirelessly transmitting service data to the plurality of mobile game apparatuses at a short distance. The service providing apparatus comprises service data transmission means (S108) and priority control data transmission means (transmitting a parent apparatus beacon frame in S37 and S105). The service data transmission means wirelessly transmits, at a short distance, first identification information (transmitter ID), which is identification information of itself, to the mobile game apparatuses, receives a communication request wirelessly transmitted at a short distance to itself from at least one of the mobile game apparatuses which received the first identification information, and wirelessly transmits, at a short distance, the service data to the at least one mobile game apparatus. The priority control data transmission means wirelessly transmits, at a short distance, first priority control data (priority level) indicating that a priority level of the short distance wireless transmission of the service data by itself is higher than a priority level of the short distance wireless communication among the mobile game apparatuses. The mobile game apparatuses each comprises first processing means (S35 through S45), second processing means (S47, S51), third processing means (S49), priority control data receiving means (S64, S83, S87), determination means (S66, S68, S84, S88, S90, S94), and prohibition means (S70, S74 through S78, S84, S88, S97). The first processing means wirelessly transmits, at a short distance, second identification information, which is identification information of itself, receives a communication request wirelessly transmitted at a short distance to itself from at least one of the other mobile game apparatuses which received the second identification information, and sets the at least one other mobile game apparatus as a communication counterpart. The second processing means receives the second identification information wirelessly transmitted at a short distance from at least one of the other mobile game apparatuses and thus confirms the at least one other mobile game apparatus located in a communicable area, wirelessly transmits, at a short distance, the communication request to the at least one other mobile game apparatus represented by the received second identification information, and sets the at least one other mobile game apparatus as a communication counterpart. The third processing means receives the first identification information wirelessly transmitted at a short distance from the service providing apparatus and thus confirms the service providing apparatus located in the communicable area, wirelessly transmits, at a short distance, the communication request to the service providing apparatus represented by the received first identification information, and receives the service data from the service providing apparatus. The priority control data receiving means attempts to receive the first priority control data. The determination means determines whether or not the first priority control data has been received. The prohibition means prohibits the short distance wireless communication with the at least one other mobile game apparatus when the first priority control data has been received.

The above-mentioned performance of short distance wireless communication encompasses, for example, execution of a communication game via a short distance wireless communication, and transmission of a game program or data from one apparatus to another apparatus. The service providing apparatus may wirelessly distribute a game program or game data to a service target apparatus, or may be an ASP (Application Service Provider) for providing service data. To the first identification information transmitted from the service providing apparatus, information representing the name of the service providing apparatus or the name of the service may be attached. The mobile game apparatus which received the first identification information may display such information attached to the first identification information on a display section of the apparatus and allow a user thereof to select whether or not to receive the service by an input on an operation section, before making the communication request.

The first priority control data may be included in transmission information constantly transmitted, such as a beacon frame. The first priority control data may be transmitted when the wireless communication for providing service data is to be prioritized (regardless of whether or not the service providing apparatus is in the state of providing service data). Alternatively, the first priority control data may be transmitted only when the service providing apparatus is in the state of providing service data. The "state of providing service data" may be any one of, or a combination of at least two of: (1) a state where the service providing apparatus is providing service or accepting a request for service, (2) a state where the service providing apparatus is transmitting its own identification information, (3) a state where a mobile game apparatus has requested the service providing apparatus to provide service data, or the service providing apparatus has issued a permission on such a request, and (4) a state where the service providing apparatus is actually transmitting service data to the mobile game apparatus (a state where a wireless communication has been started between the service providing apparatus and the mobile game apparatus). The first priority control data may be transmitted together with the first identification information. In this case, the mobile game apparatus may receive the first identification information transmitted from the service providing apparatus, specify the service providing apparatus based on the first identification information, and request the service providing apparatus to provide service data.

The priority control data transmission means may be included in another apparatus included in the wireless communication system, instead of the service providing apparatus. The first priority control data may be transmitted by another communication means between the service providing apparatus and the mobile game apparatus, instead of the short distance wireless transmission. A first game apparatus including the first processing means and a second game apparatus including the second processing means may be provided.

The identification information may be transmitted by a short distance wireless transmission in the form of (1) or (2).

(1) Identification information of itself is transmitted by broadcast. For example, the service providing apparatus or the mobile game apparatus may perform a wireless communication based on the IEEE802.11 standards. When a beacon frame is transmitted as above, the identification information of itself may be transmitted on the beacon frame.

(2) Identification information of itself is transmitted in accordance with an identification information transmission request from another apparatus (e.g., a probe request when a wireless communication based on the IEEE802.11 standards is performed).

The priority control data receiving means may scan the first priority control data currently transmitted at a predetermined frequency without specifying a service providing apparatus. For example, the priority control data receiving means may scan the first priority control data currently transmitted at a predetermined frequency for a certain time period. Alternatively, the priority control data receiving means may scan the first priority control data currently transmitted at a predetermined frequency at a certain interval. For example, the processing of attempting to receive the first priority control data may be performed at any one of (or a combination of a plurality of) the following timings.

Before starting the first processing means or the second processing means (at an initial timing when starting the program or at the start of communication processing).

After starting the first processing, at a predetermined timing in accordance with the first processing means (especially, in the case of (a) through (h)).

After starting the second processing, at a predetermined timing in accordance with the second processing means (especially, in the case of (i) through (q)).

In the case where the first processing means and the second processing means are alternately started, the processing is performed by either of the two (e.g., by the second processing means).

Immediately before performing the processing of (a) through (q).

The receipt of the first priority control data may be attempted at least once, a plurality of times, or periodically (e.g., at an interval of a predetermined time period) at the above timing.

The processing of determination may be performed at any one of (or a combination of a plurality of) the following timings.

When executing the processing of attempting to receive.

Immediately before performing the processing of (a) through (q), it is determined whether or not the first priority control data was received in the past (or within a certain time period in the past).

It is determined periodically whether or not the first priority control data was received in the past (or within a certain time period in the past).

The prohibition means may prohibit at least one of the following when receiving the first priority control data:

(a) processing of accepting a player input to start the first processing means;

(b) processing of starting the first processing means;

(c) processing of accepting a player input for allowing the first processing means to transmit the second identification information;

(d) processing of allowing the first processing means to transmit the second identification information;

(e) processing of allowing the first processing means to receive the communication request;

(f) processing of allowing the first processing means to transmit a communication permission to the at least other mobile game apparatus which is a transmitter of the communication request;

(g) processing of accepting a player input to start communication with the communication counterpart set by the first processing means;

(h) processing of starting communication with the communication counterpart set by the first processing means;

(i) processing of accepting a player input to start the second processing means;

(j) processing of starting the second processing means;

(k) processing of allowing the second processing means to receive the second identification information;

(l) processing of accepting a player input for allowing the second processing means to transmit the communication request;

(m) processing of allowing the second processing means to transmit the communication request;

(n) processing of accepting a player input for allowing the second processing means to transmit a request to the at least one other mobile game apparatus to request a short distance wireless communication of the second identification information;

(o) processing of allowing the second processing means to transmit the request to the at least one other mobile game apparatus to request the short distance wireless communication of the second identification information;

(p) processing of accepting a player input to start communication with the communication counterpart set by the second processing means; and (q) processing of starting communication with the communication counterpart set by the second processing means.

The following processing may be performed in accordance with a player input or automatically. In the former case, the processing is prohibited when a received player input instructs the execution of the processing. In the latter case, the processing is prohibited at an automatically set timing.

(b) processing of starting the first processing means;

(d) processing of allowing the first processing means to transmit the second identification information;

(e) processing of allowing the first processing means to receive the communication request;

(f) processing of allowing the first processing means to transmit a communication permission to the at least other mobile game apparatus which is a transmitter of the communication request;

(h) processing of starting communication with the communication counterpart set by the first processing means;

(j) processing of starting the second processing means;

(k) processing of allowing the second processing means to receive the second identification information;

(m) processing of allowing the second processing means to transmit the communication request;

(o) processing of allowing the second processing means to transmit the request to the at least one other mobile game apparatus to request the short distance wireless communication of the second identification information; and (q) processing of starting communication with the communication counterpart set by the second processing means.

The determination means may compare the priority level represented by the received first priority control data with the priority level of itself. When the priority level of itself is determined to be equal to or higher than priority level represented by the received first priority control data, the prohibition means may not perform the prohibition.

The communication protocol by which the service providing apparatus determines a mobile game apparatus as a receiver of the service among a plurality of mobile game apparatuses may be the same as the communication protocol by which the mobile game apparatus determines a communication counterpart among a plurality of mobile game apparatuses. More specifically, the service providing apparatus transmits a parent apparatus beacon frame described later. In this case, the first identification information transmitted from the service providing apparatus and second identification information (described later) transmitted from the mobile game apparatus may be set in the same slot ("addressee ID" described later) of the communication protocol. As described above, the first priority control data may be attached to the first identification information ("priority level" described later) In this case, second priority control data (described later) may not be attached to the second identification information, and priority control data representing a lower priority level may be attached to the second identification information. The mobile game apparatus receives the identification information (both the first identification information and the second identification information) transmitted to the slot. Here, the first identification information and the second identification information may be distinguishable from each other by additional data attached thereto, but it is not absolutely necessary that the first identification information and the second identification information are distinguishable from each other. In the case where the first identification information and the second identification information are transmitted to the same slot, a list of the identification information on the service providing apparatus and/or the mobile game apparatus (one or a plurality among the apparatus name, user name, game name, service name and the like) may be displayed. The first identification information and the second identification information may be displayed in the same list without being distinguished. In the case where the "additional data" for distinguishing the two is attached, the first identification information and the second identification information may be displayed while being distinguished from each other. (For example, either one of the two may be displayed, or both are displayed in the same list while being distinguishable.) The user may be allowed to select from the list the target to which a request (for providing service and/or executing a communication game) is to be transmitted.

The second identification information transmitted from the mobile game apparatus or the first identification information transmitted from the service providing apparatus may be transmitted to other unspecified mobile game apparatuses. Namely, such identification information may be transmitted to mobile game apparatuses by broadcast. The mobile game apparatus may request unspecified mobile game apparatuses or service providing apparatuses to transmit the first identification information or the second identification information, and upon receipt of such a request, the mobile game apparatuses or the service providing apparatuses may transmit the first identification information or the second identification information.

The service providing apparatus may provide service data to a specified mobile game apparatus or unspecified mobile game apparatuses. In the former case, the service providing apparatus receives a request for the service from the mobile game apparatus and provides the service to the mobile game apparatus, and the mobile game apparatus receives the service. Specifically, for example, the service providing apparatus may receive, from the mobile game apparatus which requested the service, its identification information, register the identification information in the service providing apparatus, and specify the registered mobile game apparatus to transmit the service data. Alternatively, the service providing apparatus may transmit identification information of itself to the mobile game apparatus, and the mobile game apparatus which received the identification information may request the service. In the case where the service providing apparatus provides service data to unspecified mobile game apparatuses, service data transmitted wirelessly in an unspecified manner is received by any mobile game apparatus.

In a second aspect based on the first aspect, when receiving the first priority control data, the prohibition means prohibits at least one of (a) through (h) and at least one of (i) through (q):

(a) processing of accepting a player input to start the first processing means;

(b) processing of starting the first processing means;

(c) processing of accepting a player input for allowing the first processing means to transmit the second identification information;

(d) processing of allowing the first processing means to transmit the second identification information;

(e) processing of allowing the first processing means to receive the communication request;

(f) processing of allowing the first processing means to transmit a communication permission to the at least other mobile game apparatus which is a transmitter of the communication request;

(g) processing of accepting a player input to start communication with the communication counterpart set by the first processing means;

(h) processing of starting communication with the communication counterpart set by the first processing means;

(i) processing of accepting a player input to start the second processing means;

(j) processing of starting the second processing means;

(k) processing of allowing the second processing means to receive the second identification information;

(l) processing of accepting a player input for allowing the second processing means to transmit the communication request;

(m) processing of allowing the second processing means to transmit the communication request;

(n) processing of accepting a player input for allowing the second processing means to transmit a request to the at least one other mobile game apparatus to request a short distance wireless communication of the second identification information;

(o) processing of allowing the second processing means to transmit the request to the at least one other mobile game apparatus to request the short distance wireless communication of the second identification information;

(p) processing of accepting a player input to start communication with the communication counterpart set by the second processing means; and (q) processing of starting communication with the communication counterpart set by the second processing means.

The service providing apparatus may wirelessly transmit, at a short distance, the first priority control data as attached to the first identification information. In this case, the third processing means may receive the first identification information wirelessly transmitted at a short distance from the service providing apparatus, and attempt to receive the first priority control data attached to the first identification information, so that the first priority control data can be received without separately requiring priority control data receiving means.

In a third aspect based on the first aspect, the second processing means and the third processing means are formed of one common processing means for recognizing the service providing apparatus and the at least one other mobile game apparatus without distinguishing, and transmitting the communication request thereto. The common processing means receives the first identification information wirelessly transmitted at a short distance from the service providing apparatus and the second identification information wirelessly transmitted at a short distance from the at least one other mobile game apparatus, and thus confirms the service providing apparatus and the at least one other mobile game apparatus located in the communicable area; and wirelessly transmits, at a short distance, the communication request to the service providing apparatus represented by the received first identification information or to the at least one other mobile game apparatus represented by the received second identification information.

The first processing means may transmit, at a short distance, second identification information to a predetermined slot of the communication protocol for determining a communication counterpart among the mobile game apparatuses. The service providing apparatus may set a counterpart to which service data is to be provided by a short distance wireless transmission, among the mobile game apparatuses, using the communication protocol. The service providing apparatus may also transmit the first identification information to the slot. The common processing means may receive the identification information transmitted to the slot. Thus, the first identification and the second identification can both be received.

The first identification information and the second identification information may be or may not be distinguished as being transmitted from the service providing apparatus or as being transmitted from the mobile game apparatus. To such identification information, information on the name of the transmitter, the user name of the transmitter, the service name, the game name and the like may be attached.

In a fourth aspect based on the third aspect, the priority control data transmission means transmits, at a short distance, the first priority control data as attached to the first identification information transmitted by the service data transmission means. The priority control data receiving means receives the first identification information wirelessly transmitted at a short distance from the service providing apparatus to the common processing means and the second identification information wirelessly transmitted at a short distance from the at least one other mobile game apparatus, and attempts to receive the first priority control data attached to the first identification information, and thus is included in the common processing means. When receiving the first priority control data, the prohibition means prohibits at least one of (i) through (q):

(i) processing of accepting a player input to start the common processing means;

(j) processing of starting the common processing means;

(k) processing of allowing the common processing means to receive the second identification information;

(l) processing of accepting a player input for allowing the common processing means to transmit the communication request;

(m) processing of allowing the common processing means to transmit the communication request;

(n) processing of accepting a player input for allowing the common processing means to transmit a request to the at least one other mobile game apparatus to request a short distance wireless communication of the second identification information;

(o) processing of allowing the common processing means to transmit the request to the at least one other mobile game apparatus to request the short distance wireless communication of the second identification information;

(p) processing of accepting a player input to start communication with the communication counterpart set by the common processing means; and (q) processing of starting communication with the communication counterpart set by the common processing means.

In a fifth aspect based on the first aspect, each of the plurality of mobile game apparatuses further comprises alternate repeating means for alternately repeating the processing by the first processing means and the processing by the second processing means to set the at least one other mobile game apparatus as the communication counterpart. When receiving the first priority control data, the prohibition means prohibits at least one of (a) through (h):

(a) processing of accepting a player input to start the first processing means;

(b) processing of starting the first processing means;

(c) processing of accepting a player input for allowing the first processing means to transmit the second identification information;

(d) processing of allowing the first processing means to transmit the second identification information;

(e) processing of allowing the first processing means to receive the communication request;

(f) processing of allowing the first processing means to transmit a communication permission to the at least other mobile game apparatus which is a transmitter of the communication request;

(g) processing of accepting a player input to start communication with the communication counterpart set by the first processing means; and (h) processing of starting communication with the communication counterpart set by the first processing means.

In a sixth aspect based on the first aspect, each of the plurality of mobile game apparatuses further comprises second priority control data transmission means for wirelessly transmitting, at a short distance, second priority control data representing a priority level of the short distance wireless communication of itself in the first processing means. The priority control data receiving means attempts to receive the first priority control data transmitted from the service providing apparatus and the second priority control data transmitted from the at least one other mobile game apparatus. The determination means compares the priority level of the short distance wireless communication of itself, with the priority level represented by the second priority control data received by the priority control data receiving means, and determines whether or not the priority level of the short distance wireless communication of itself is sufficiently high to fulfill a predetermined condition. The prohibition means prohibits the short distance wireless communication with the at least one other mobile game apparatus when the result of determination made by the determination means using the second priority control data is negative or when the first priority control data is received.

The predetermined condition may be, for example, the following.

The priority level of itself is equal to or higher than the highest priority level represented by the received second priority control data.

The priority level of itself is higher than the highest priority level represented by the received second priority control data.

The priority level of itself is within a predetermined range from the highest priority level represented by all the received priority control data.

The priority level of itself is higher, by a predetermined degree, than the highest priority level represented by the received second priority control data.

The priority level of itself is equal to or higher than the average of the priority levels represented by the received second priority control data.

The priority level of itself is equal to or higher than a priority level which is lower, by a predetermined degree, than the highest priority level represented by the received second priority control data.

In a seventh aspect based on the sixth aspect, the priority control data receiving means scans the first priority control data and the second priority control data currently transmitted at a predetermined frequency. The determination means compares the priority level of the short distance wireless communication of itself, with the highest priority level among the priority levels represented by the first priority control data and the second priority control data received by the scanning.

The priority control data receiving means may scan the priority control data currently transmitted at a predetermined frequency, for example, for a predetermined time period or a plurality of times at a predetermined timing (e.g., at an interval of a predetermined time period).

In an eighth aspect based on the first aspect, the plurality of mobile game apparatuses wirelessly communicate data for a mutual short distance wireless communication using a channel selected from a plurality of channels. The priority control data receiving means attempts to receive the first priority control data in each of the plurality of channels. The first processing means transmits the second identification information using a channel not used for receiving the first priority control data, among the plurality of channels. The plurality of mobile game apparatuses mutually perform the short distance wireless communication using the channel used for transmitting the second identification information.

In a ninth aspect based on the eighth aspect, each of the plurality of mobile game apparatuses further comprises actual use degree measurement means for measuring a wireless communication use degree of each of the plurality of channels. The first processing means transmits the second identification information using a channel having the lowest wireless communication use degree, among the channels not used for receiving the first priority control data.

In a tenth aspect based on the first aspect, the priority control data receiving means does not attempt to receive the first priority control data after starting a communication with the communication counterpart set by the first processing means or the second processing means.

In an eleventh aspect based on the first aspect, the priority control data transmission means transmits, together with the first priority control data, next receiving timing data designating the next timing for attempting to receive the first priority control data. When receiving the first priority control data, the priority control data receiving means attempts to receive the first priority control data again at the timing designated by the next receiving timing data transmitted together with the first priority control data.

The next receiving timing data may designate the next time or time interval. In the latter case, an attempt to receive may be repeated at a designated time interval.

In a twelfth aspect based on the first aspect, the priority control data transmission means wirelessly transmits, at a short distance, the first priority control data using a channel selected among the plurality of channels for wirelessly transmitting, at a short distance, the service data. The priority control data receiving means attempts to receive the first priority control data in each of the plurality of channels. The first processing means transmits the second identification information using a channel not used for receiving the first priority control data, among the plurality of channels. The plurality of mobile game apparatuses mutually perform the short distance wireless communication using the channel used for transmitting the second identification information.

In a thirteenth aspect based on the twelfth aspect, each of the plurality of mobile game apparatuses further comprises actual use degree measurement means for measuring a wireless communication use degree of each of the plurality of channels. The first processing means transmits the second identification information using a channel having the lowest wireless communication use degree, among the channels not used for receiving the first priority control data.

In a fourteenth aspect based on the sixth aspect, each of the plurality of mobile game apparatuses further comprises radio wave use ratio measurement means for measuring a radio wave use ratio of the channel used for the short distance wireless transmission. The prohibition means prohibits the short distance wireless communication with the at least one other mobile game apparatus regardless of the result of measurement by the radio wave use ratio measurement means when the priority control data receiving means receives the first priority control data, and does not prohibit the short distance wireless communication with the at least one other mobile game apparatus when the result of determination made by the determination means using the second priority control data is negative but the radio wave use ratio measured by the radio wave use ratio measurement means is equal to or lower than a predetermined threshold.

A fifteenth aspect of certain exemplary embodiments is directed to a wireless communication system including a plurality of mobile game apparatuses for wirelessly communicating with each other at a short distance. Each of the plurality of mobile game apparatuses comprises first processing means, second processing means, priority control data transmission means, priority control data receiving means, determination means, and prohibition means. The first processing means wirelessly transmits, at a short distance, identification information, which is identification information of itself, receives a communication request wirelessly transmitted at a short distance to itself from at least one of the other mobile game apparatuses which received the identification information, and sets the at least one other mobile game apparatus as a communication counterpart. The second processing means receives the identification information wirelessly transmitted at a short distance from at least one of the other mobile game apparatuses and thus confirms the at least one other mobile game apparatus located in a communicable area, wirelessly transmits, at a short distance, the communication request to the at least one other mobile game apparatus represented by the received identification information, and sets the at least one other mobile game apparatus as a communication counterpart. The priority control data transmission means wirelessly transmits, at a short distance, priority control data representing a priority level of the short distance wireless communication of itself. The priority control data receiving means attempts to receive the priority control data. The determination means compares the priority level of the short distance wireless communication of itself, with a priority level represented by the priority control data received by the priority control data receiving means, and determines whether or not the priority level of the short distance wireless communication of itself is sufficiently high to fulfill a predetermined condition. The prohibition means prohibits the short distance wireless communication with the at least one other mobile game apparatus when the result of determination made by the determination means is negative.

The priority control data is data representing the priority level of the short distance wireless communication performed by the mobile game apparatus. The priority level may be set, for example, for each apparatus. In this case, data representing the priority level may be set on nonvolatile memory means in the apparatus in advance or in a changeable manner. Alternatively, the priority level may be set for each game. In this case, data representing the priority level may be included in the game program, and the mobile game apparatus may set the priority level by reading the data from the game program. Alternatively, data representing the priority level may be stored on the game medium together with the game program, and the mobile game apparatus may set the priority level by reading the data on the game program to be executed.

The prohibition means may prohibit at least one of the following:

(a) processing of accepting a player input to start the first processing means;

(b) processing of starting the first processing means;

(c) processing of accepting a player input for allowing the first processing means to transmit the identification information;

(d) processing of allowing the first processing means to transmit the identification information;

(e) processing of allowing the first processing means to receive the communication request;

(f) processing of allowing the first processing means to transmit a communication permission to the at least other mobile game apparatus which is a transmitter of the communication request;

(g) processing of accepting a player input to start communication with the communication counterpart set by the first processing means;

(h) processing of starting communication with the communication counterpart set by the first processing means;

(i) processing of accepting a player input to start the second processing means;

(j) processing of starting the second processing means;

(k) processing of allowing the second processing means to receive the identification information;

(l) processing of accepting a player input for allowing the second processing means to transmit the communication request;

(m) processing of allowing the second processing means to transmit the communication request;

(n) processing of accepting a player input for allowing the second processing means to transmit a request to the at least one other mobile game apparatus to request a short distance wireless communication of the identification information;

(o) processing of allowing the second processing means to transmit the request to the at least one other mobile game apparatus to request the short distance wireless communication of the identification information;

(p) processing of accepting a player input to start communication with the communication counterpart set by the second processing means; and (q) processing of starting communication with the communication counterpart set by the second processing means.

The priority control data may be included in transmission information constantly transmitted, such as a beacon frame. The priority control data may be transmitted, in any one of, or a combination of a plurality of, the following states:

(1) a state where the mobile game apparatus has been started;

(2) a state where the mobile game apparatus is transmitting identification information of itself;

(3) a state where the mobile game apparatus is inviting other mobile game apparatuses to perform a wireless communication;

(4) a state where another mobile game apparatus has requested the mobile game apparatus for a wireless communication, or the mobile game apparatus has issued a permission on such a request; and (5) a state where a wireless communication has been started between the mobile game apparatus and another mobile game apparatus.

The priority control data may be transmitted together with identification information. To the identification information, information on the name of the transmitter, the user name of the transmitter, the game name and the like may be attached.

In a sixteenth aspect based on the fifteenth aspect, when the result of determination made by the determination means is negative, the prohibition means prohibits at least one of (a) through (h) and at least one of (i) through (q):

(a) processing of accepting a player input to start the first processing means;

(b) processing of starting the first processing means;

(c) processing of accepting a player input for allowing the first processing means to transmit the identification information;

(d) processing of allowing the first processing means to transmit the identification information;

(e) processing of allowing the first processing means to receive the communication request;

(f) processing of allowing the first processing means to transmit a communication permission to the at least other mobile game apparatus which is a transmitter of the communication request;

(g) processing of accepting a player input to start communication with the communication counterpart set by the first processing means;

(h) processing of starting communication with the communication counterpart set by the first processing means;

(i) processing of accepting a player input to start the second processing means;

(j) processing of starting the second processing means;

(k) processing of allowing the second processing means to receive the identification information;

(l) processing of accepting a player input for allowing the second processing means to transmit the communication request;

(m) processing of allowing the second processing means to transmit the communication request;

(n) processing of accepting a player input for allowing the second processing means to transmit a request to the at least one other mobile game apparatus to request a short distance wireless communication of the identification information;

(o) processing of allowing the second processing means to transmit the request to the at least one other mobile game apparatus to request the short distance wireless communication of the identification information;

(p) processing of accepting a player input to start communication with the communication counterpart set by the second processing means; and (q) processing of starting communication with the communication counterpart set by the second processing means.

In a seventeenth aspect based on the fifteenth aspect, the priority control data transmission means transmits, at a short distance, the priority control data as attached to the identification information transmitted by the first processing means. The priority control data receiving means receives the identification information wirelessly transmitted at a short distance from the at least one other mobile game apparatus to the second processing means, and attempts to receive the priority control data attached to the identification information, and thus is included in the second processing means. When the result of determination made by the determination means is negative, the prohibition means prohibits at least one of (i) through (q) above.

In an eighteenth aspect based on the fifteenth aspect, each of the plurality of mobile game apparatuses further comprises alternate repeating means for alternately repeating the processing by the first processing means and the processing by the second processing means to set the at least one other mobile game apparatus as the communication counterpart. When the result of determination made by the determination means is negative, the prohibition means prohibits at least one of (a) through (h) above.

In a nineteenth aspect based on the fifteenth aspect, the priority control data receiving means does not attempt to receive the priority control data after starting a communication with the communication counterpart set by the first processing means or the second processing means.

In a twentieth aspect based on the fifteenth aspect, the priority control data receiving means scans the priority control data currently transmitted at a predetermined frequency. The determination means compares the priority level of the short distance wireless communication of itself, with the highest priority level among the priority levels represented by the priority control data received by the scanning.

The priority control data receiving means may scan the priority control data currently transmitted at a predetermined frequency, for example, for a predetermined time period or a plurality of times at a predetermined timing (e.g., at an interval of a predetermined time period).

In a twenty-first aspect based on the fifteenth aspect, the priority control data transmission means transmits, together with the priority control data, next receiving timing data designating the next timing for attempting to receive the priority control data. When receiving the priority control data, the priority control data receiving means attempts to receive the priority control data again at the timing designated by the next receiving timing data transmitted together with the priority control data.

The next receiving timing data may designate the next time or time interval. In the latter case, an attempt to receive may be repeated at a designated time interval.

In a twenty-second aspect based on the fifteenth aspect, the priority control data transmission means wirelessly transmits, at a short distance, the priority control data using a channel selected, among the plurality of channels, for performing a short distance wireless communication with the at least one other mobile game apparatus. The priority control data receiving means attempts to receive the priority control data in each of the plurality of channels. The first processing means transmits the identification information using a channel for which the short distance wireless communication of itself is determined to have a priority level sufficiently high to fulfill the predetermined condition, among the plurality of channels. The plurality of mobile game apparatuses mutually perform the short distance wireless communication using the channel used for transmitting the identification information.

In a twenty-third aspect based on the fifteenth aspect, each of the plurality of mobile game apparatuses further comprises actual use degree measurement means for measuring a wireless communication use degree of each of the plurality of channels. The first processing means transmits the identification information using a channel having the lowest wireless communication use degree among the channels for which the short distance wireless communication of itself is determined to have a priority level sufficiently high to fulfill the predetermined condition.

In a twenty-fourth aspect based on the fifteenth aspect, the plurality of mobile game apparatuses wirelessly communicate data for a mutual short distance wireless communication using a channel selected from a plurality of channels. The priority control data receiving means attempts to receive the priority control data in each of the plurality of channels. The first processing means transmits the identification information using a channel for which the short distance wireless communication of itself is determined to have a priority level sufficiently high to fulfill the predetermined condition, among the plurality of channels. The plurality of mobile game apparatuses mutually perform the short distance wireless communication using the channel used for transmitting the identification information.

In a twenty-fifth aspect based on the twenty-fourth aspect, each of the plurality of mobile game apparatuses further comprises actual use degree measurement means for measuring a wireless communication use degree of each of the plurality of channels. The first processing means transmits the identification information using a channel having the lowest wireless communication use degree among the channels for which the short distance wireless communication of itself is determined to have a priority level sufficiently high to fulfill the predetermined condition.

In a twenty-sixth aspect based on the fifteenth aspect, each of the plurality of mobile game apparatuses further comprises radio wave use ratio measurement means for measuring a radio wave use ratio of the channel used for the short distance wireless communication. Even when the result of determination made by the determination means is negative, the prohibition means does not prohibit the short distance wireless communication with the at least one other mobile game apparatus if the radio wave use ratio measured by the radio wave use ratio measurement means is equal to or lower than a predetermined threshold.

The radio wave use ratio measuring means measures how much transmission radio wave actually exists. There are various usable measuring methods. For example, the ratio of the time period in which the carrier signal is transmitted may be measured, or the ratio of the time period in which a radio wave of a certain strength or higher is transmitted may be measured.

A twenty-seventh aspect of certain exemplary embodiments is directed to a wireless communication system including a plurality of mobile game apparatuses for wirelessly communicating with each other at a short distance. Each of the plurality of mobile game apparatuses comprises first processing means and second processing means. The first processing means wirelessly transmits, at a short distance, identification information, which is identification information of itself, together with priority control data representing a priority level of the short distance wireless communication of itself, receives a communication request wirelessly transmitted at a short distance to itself from at least one of the other mobile game apparatuses which received the identification information, and sets the at least one other mobile game apparatus as a communication counterpart. The second processing means receives the identification information and the priority control data wirelessly transmitted at a short distance from at least one of the other mobile game apparatuses and thus confirms the at least one other mobile game apparatus located in a communicable area, wirelessly transmits, at a short distance, the communication request to the at least one other mobile game apparatus represented by the received identification information, and sets the at least one other mobile game apparatus as a communication counterpart. The second processing means compares a communication request addressee priority level, which is a priority level represented by the priority control data transmitted from the mobile game apparatus which is an addressee of the communication request, with a priority level represented by the priority control data transmitted from another mobile game apparatus located in the communicable area, determines whether or not the communication request addressee priority level is sufficiently high to fulfill a predetermined condition, and when the result of determination is negative, prohibits the short distance wireless communication with the mobile game apparatus which is the addressee of the communication request.

The prohibition means may prohibit at least one of the following:

(i) processing of accepting a player input to start the second processing means;

(j) processing of starting the second processing means;

(k) processing of allowing the second processing means to receive the identification information;

(l) processing of accepting a player input for allowing the second processing means to transmit the communication request;

(m) processing of allowing the second processing means to transmit the communication request;

(n) processing of accepting a player input for allowing the second processing means to transmit a request to the at least one other mobile game apparatus to request a short distance wireless communication of the identification information;

(o) processing of allowing the second processing means to transmit the request to the at least one other mobile game apparatus to request the short distance wireless communication of the identification information;

(p) processing of accepting a player input to start communication with the communication counterpart set by the second processing means; and (q) processing of starting communication with the communication counterpart set by the second processing means.

According to the first aspect, service data from a service providing apparatus, which is to be prioritized, can be transmitted or received with priority over other wireless communications. Therefore, such a wireless communication to be prioritized can be protected from being made difficult.

According to the second aspect, the priority level is confirmed both by an apparatus for transmitting identification information (apparatus 1) and an apparatus for transmitting a communication request (apparatus 2) to the apparatus 1. For example, in the case where the first priority control data has not been transmitted when the priority is confirmed by the apparatus 1 but was transmitted after that, prohibition processing can be performed when the priority is confirmed by the apparatus 2. When the priority control data has not been transmitted to a communicable area of the apparatus 1 but has been transmitted to a communicable area of the apparatus 2 (or vice versa), prohibition processing can be performed with certainty.

According to the third aspect, the identification information of the service providing apparatus and the identification information of other mobile game apparatuses can be confirmed at the same time. When the first priority control data is received, service data can be received from the service providing apparatus and the communication with other mobile game apparatuses is prohibited. A wireless communication system, in which the mobile game apparatuses can receive service data from the service providing apparatus and the mobile game apparatuses can communicate with each other, can operate as follows. When provision of service data is prioritized, the mobile game apparatuses are allowed to receive the service data but are prohibited from communicating with each other. When there is not a communication of service data, the mobile game apparatuses are allowed to communicate with each other. In this manner, a superb wireless communication system is realized.

According to the fourth aspect, the second processing means confirms which service providing apparatus or which mobile game apparatus is communicable, and this confirmation processing makes it possible to check whether or not the first priority control data has been transmitted. When necessary, later processing can be prohibited. Therefore, the processing of prioritizing a communication can be made efficient.

According to the fifth aspect, the second processing means confirms which service providing apparatus or which mobile game apparatus is communicable, and this confirmation processing makes it possible to transmit the first priority control data. Using this, the prohibition processing is realized the next time by the first processing means.

According to the sixth aspect, a wireless communication for providing service data can be protected from being made difficult, and also a wireless communication for a highly prioritized communication game can be protected from being made difficult.

According to the seventh aspect, in the case where there are a plurality of service providing apparatuses or mobile game apparatuses, the priority level of a certain mobile game apparatus is compared with the highest priority level. Therefore, a wireless communication for a highly prioritized communication game can be protected from being made difficult.

According to the eighth aspect, wireless communications among a plurality of mobile game apparatuses (e.g., communications for communication games) are allowed to co-exist efficiently while the priority levels are taken into consideration.

According to the ninth aspect, a determination based on the priority levels of wireless communications, and a determination based on the use ratios of the channels, are both performed.

According to the tenth aspect, the execution of a wireless communication among a plurality of mobile game apparatuses (e.g., a communication for a communication game) is not prevented.

According to the eleventh aspect, the frequency for receiving the priority control data can be controlled.

According to the twelfth and thirteenth aspects, a communication for transmitting service data and a communication for a communication game or the like are allowed to co-exist efficiently while the communication for transmitting the service data is prioritized.

According to the fourteenth aspect, the wireless communications to be prioritized can be assigned levels.

In a wireless communication system including a plurality of mobile game apparatuses, priority levels can be set for the wireless communications performed among the mobile game apparatuses for playing communication games or the like. Thus, the effects equivalent to those of the above-described wireless communication system including the service providing apparatus and a plurality of mobile game apparatuses are provided. For example, by setting the priority level of the communication game typically performed in a presentation to be high, the execution of this communication game is protected from being made difficult due to other communication games.

These and other features, aspects and advantages of certain exemplary embodiments will become more apparent from the following detailed description when taken in conjunction with the accompanying drawings.

BRIEF DESCRIPTION OF THE DRAWINGS

FIG. 3 is a conceptual view illustrating a state where a plurality of game apparatuses 1 located within a wirelessly communicable area are wirelessly communicating with each other;

FIG. 4 is a conceptual view illustrating a state where one of the game apparatuses 1 located in a wirelessly communicable area is performing wireless distribution to the other game apparatuses 1;

FIG. 6 shows an example of parent apparatus beacon frame;

FIG. 7 shows an example of communication request frame;

FIG. 8 shows an example of communication permission frame;

FIG. 9 shows an example of data frame;

FIG. 10 shows an example of channel scan information;

DETAILED DESCRIPTION

Figure 1:
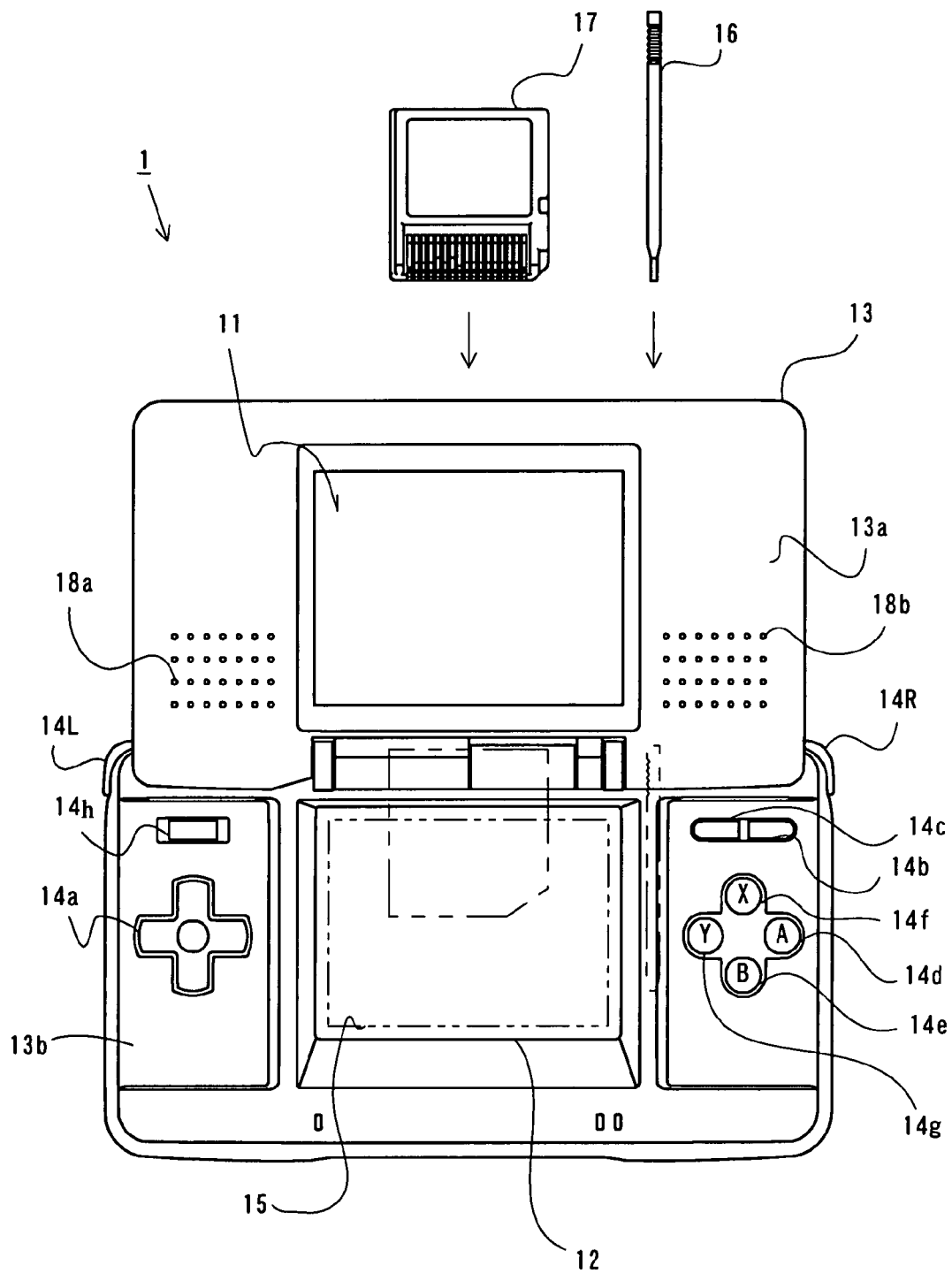
FIG. 1 is an external view of a game apparatus 1 for executing a wireless communication program according to certain exemplary embodiments.

With reference to the drawings, a wireless communication system for executing a wireless communication program according to an exemplary embodiment will be described. A wireless communication system according to certain exemplary embodiments can be embodied by a plurality of apparatuses (e.g., computers) capable of performing a wireless communication by executing a wireless communication program according to certain exemplary embodiments. In the following exemplary embodiment, a wireless communication system according to certain exemplary embodiments includes a plurality of game apparatuses 1 as exemplary information processing apparatuses. Each game apparatus 1 executes a wireless communication program. FIG. 1 is an external view of the game apparatus 1 for executing a wireless communication program according to certain exemplary embodiments. In this exemplary embodiment, the game apparatus 1 is a mobile game apparatus.

As shown in FIG. 1, the game apparatus 1 includes a first LCD (Liquid Crystal Display) 11 and a second LCD 12. A housing 13 includes an upper housing 13a and a lower housing 13b. The first LCD 11 is accommodated in the upper housing 13a, and the second LCD 12 is accommodated in the lower housing 13b. The first LCD 11 and the second LCD 12 both have a resolution of 256 dots×192 dots. In this exemplary embodiment, LCDs are used as display devices, but the certain exemplary embodiments described herein are applicable to apparatuses using any other display devices such as EL (Electro Luminescence) devices or the like. The first LCD 11 and the second LCD 12 may have any resolution.

The upper housing 13a has speaker holes 18a and 18b for releasing a sound from a pair of speakers (represented with reference numerals 30a and 30b in FIG. 2) described later.

The lower housing 13b has a cross-shaped switch 14a, a start switch 14b, a select switch 14c, an A button 14d, a B button 14e, an X button 14f, a Y button 14g, a power button 14h, an L button 14L and an R button 14R provided thereon as input elements. A touch panel 15 is provided on a screen of the second LCD 12 as an additional input element. The lower housing 13b has insertion holes for accommodating a memory card 17 and a stick 16.

The touch panel 15 may be of any system; for example, a resistance film system, an optical (infrared) system, or a static capacitance coupling system. The touch panel 15 is one exemplary pointing device having a function of, when a surface thereof is touched with the stick 16, outputting coordinate data corresponding to the position of the surface touched by the stick 16. In this exemplary embodiment, the touch panel 15 has a resolution (detection precision) of 256 dots× 192 dots like the second LCD 12. It is not absolutely necessary that the touch panel 15 has the same resolution as that of the second LCD 12.

The memory card 17 is a storage medium having a game program, a wireless communication program or the like stored thereon, and is detachably inserted into the insertion hole of the lower housing 13b.

Figure 2:
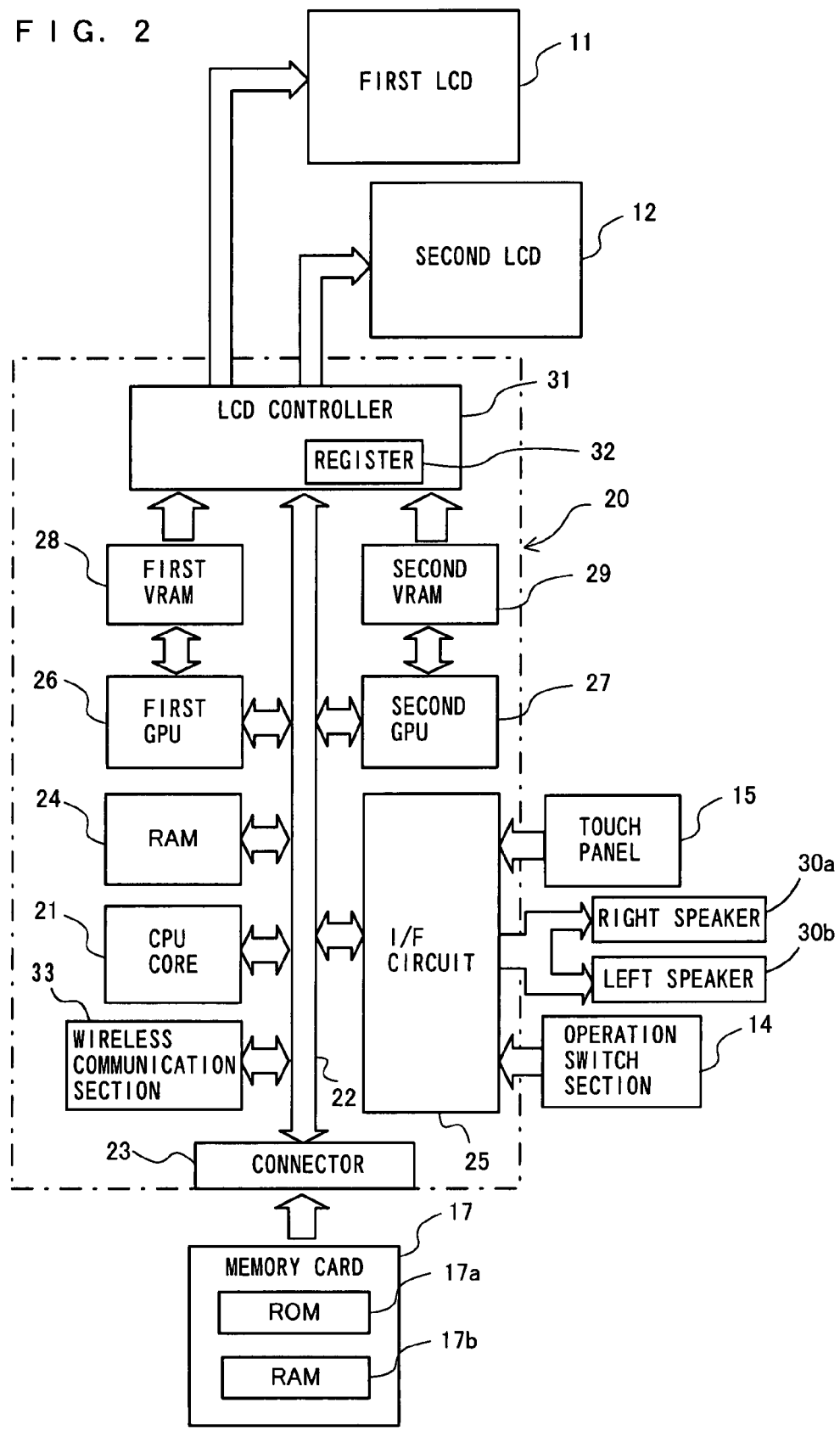
FIG. 2 is a block diagram showing an internal structure of the game apparatus 1 shown in FIG. 1.

Next, with reference to FIG. 2, an internal structure of the game apparatus 1 will be described. FIG. 2 is a block diagram illustrating an internal structure of the game apparatus 1.

In FIG. 2, a CPU core 21 is mounted on an electronic circuit board 20 accommodated in the housing 13. The CPU core 21 is connected to a connector 23 via a bus 22 and is also connected to an input/output interface circuit (represented as "I/F circuit" in FIG. 2) 25, a first GPU (Graphics Processing Unit) 26, a second GPU 27, a RAM 24, an LCD controller 31, and a wireless communication section 33. The memory card 17 is detachably connected to the connector 23. The memory card 17 includes a ROM 17a having a game program, a wireless communication program or the like stored thereon and a RAM 17b having backup data rewritably stored thereon. The ROM 17a may occasionally have stored thereon a game serial number (GSN) representing the type of the game program, a priority level described later, or the like. The game program or the wireless communication program stored on the ROM 17a of the memory card 17 is loaded onto the RAM 24, and the game program or the wireless communication program loaded onto the RAM 24 is executed by the CPU core 21. The RAM 24 optionally has stored thereon temporary data obtained by the execution of the game program by the CPU core 21, or the like, as well as the game program and the wireless communication program. The I/F circuit 25 is connected to the touch panel 15, a right speaker 30a, a left speaker 30b, and an operation switch section 14 including the cross-shaped switch 14a, the A button 14d and the like shown in FIG. 1. The right speaker 30a and the left speaker 30b are respectively located inside the speaker holes 18a and 18b, and reproduce sound in accordance with the information which is generated by the CPU core 21.

The RAM 24 also has stored thereon, for example, a transmission frame in which data to be transmitted to the other game apparatus(es) 1 or the like is described. When the game apparatus 1 is to transmit the transmission frame to the other game apparatus(es) 1 or the like, the transmission frame stored on the RAM 24 is used. Based on an instruction from the CPU core 21, the transmission frame is output to the wireless communication section 33. A receiving frame which is received from the other game apparatus(es) 1 via the wireless communication section 33 is processed by the CPU core 21 and stored on the RAM 24 when necessary. A nonvolatile memory device (not shown) in the game apparatus 1 has stored thereon a self ID of its own game apparatus in a nonvolatile manner. The self ID is described as a transmitter ID when the game apparatus 1 transmits the transmission frame to the other game apparatus(es) 1 or the like. As the self ID, a unique serial number may be stored in a manufacturing plant of the game apparatus 1, or identification information randomly generated by the game apparatus 1 may be stored. A user ID or a user name may be stored on a nonvolatile memory device (not shown).

The first GPU 26 is connected to a first VRAM (Video RAM) 28, and the second GPU 27 is connected to a second VRAM 29. In response to an instruction from the CPU core 21, the first GPU 26 creates a first game image based on the data for creating a game image stored on the RAM 24, and draws the first game image in the first VRAM 28. Similarly, in response to an instruction from the CPU core 21, the second GPU 27 creates a second game image and draws the second game image in the second VRAM 29. The first VRAM 28 and the second VRAM 29 are connected to the LCD controller 31.

The LCD controller 31 includes a register 32. The register 32 stores the value of "0" or "1" in accordance with an instruction from the CPU core 21. When the value in the register 32 is "0", the LCD controller 31 outputs the first game image drawn in the first VRAM 28 to the first LCD 11, and outputs the second game image drawn in the second VRAM 29 to the second LCD 12. When the value in the register 32 is "1", the LCD controller 31 outputs the first game image drawn in the first VRAM 28 to the second LCD 12, and outputs the second game image drawn in the second VRAM 29 to the first LCD 11.

The wireless communication section 33 has a function of transmitting or receiving data used for the game processing or other data to or from the wireless communication section 33 of the other game apparatus(es) 1 or the like. As an example, the wireless communication section 33 has a wireless communication function conforming to the wireless LAN standards of IEEE802.11. The wireless communication section 33 outputs received data to the CPU core 21. The wireless communication section 33 also transmits data instructed by the CPU core 21 to the other game apparatus(es) 1 or the like.

A wireless communication program according to certain exemplary embodiments may be supplied to a computer system via an external memory medium such as the memory card 17 or the like, or via a wired or wireless communication line. The wireless communication program may be pre-stored in a nonvolatile memory device in a computer system. The information storage medium for storing the wireless communication program may be any of a CD-ROM, a DVD or other types of optical disc-shaped storage medium instead of the nonvolatile memory device.

Before describing specific processing executed by a wireless communication program using the game apparatus 1, an exemplary embodiment of wireless transmission performed by such processing among a plurality of game apparatus 1 will be described with reference to FIG. 3 and FIG. 4.

FIG. 3 is a conceptual view illustrating a state where a plurality of game apparatuses 1 located within a wirelessly communicable area are wirelessly communicating with each other. In order to give a specific description, three game apparatuses 1 are assumed to be located in such an area in the following example. The three game apparatuses 1 can be set as a parent apparatus or a child apparatus by a predetermined setting performed by a user. The parent apparatus is a game apparatus which requests (invites) other game apparatuses 1 to play a communication game with the parent apparatus itself. The child apparatus is a game apparatus which has responded to the invitation. In this exemplary embodiment, the game apparatuses 1 are set as a parent apparatus or a child apparatus. Alternatively, the game apparatuses 1 may exchange a request for forming a group with one another as holding an equal position. Even in the case where the game apparatuses 1 are set as a parent apparatus or a child apparatus as in this exemplary embodiment, the game apparatuses 1 may communicate with one another as holding an equal position after the communication game is started.

In the following example, a game apparatus 1P is set as a parent apparatus, and game apparatuses 1C1 and 1C2 are set as child apparatuses. The three game apparatuses 1P, 1C1 and 1C2 have the same structure as the game apparatus 1 described above. In this specification, a game apparatus represented with "P" is a parent apparatus, and a game apparatus represented with "C" is a child apparatus.

In FIG. 3, for allowing a plurality of game apparatuses 1 to wirelessly communicate with one another to play a multi-play game or the like, a group of the plurality of game apparatuses 1 for such a wireless communication is formed. One of the plurality of game apparatuses 1 is set as a parent apparatus (game apparatus 1P) and the remaining game apparatuses 1 are set as child apparatuses (game apparatus 1C1 and game apparatus 1C2).

For starting a wireless communication from a state where no group is formed, one of the game apparatuses 1 is selected to be set as a game parent apparatus (parent apparatus which executes a communication game) by the user. Such a game apparatus 1 selects a channel to be used for the wireless communication and is set as a parent apparatus which uses the selected channel (game apparatus 1P). As described later in more detail, in this exemplary embodiment, game apparatuses which can be a parent apparatus are limited based on a predetermined condition. For example, in the case where a wirelessly communicable area with a game apparatus 1 to be set as a parent apparatus encompasses a group of apparatuses involved in a wireless communication or another parent apparatus using the same channel, such a game apparatus 1 may possibly not be a parent apparatus depending on the priority level of the wireless communication, the radio wave use ratio of the channel or other conditions.

When the game apparatus 1P is set as a parent apparatus, the game apparatus 1P transmits a transmission frame (parent apparatus beacon frame) at a predetermined cycle (e.g., every 200 ms) by broadcast in order to notify the existence of the parent apparatus and particulars thereof. The other game apparatuses 1 located within a wirelessly communicable area with the parent apparatus 1P receive the parent apparatus beacon frame by channel scan processing. Each game apparatus 1 which has received the parent apparatus beacon frame displays a list of parent apparatuses on a screen thereof and thus notifies a player thereof of the parent apparatuses to which a communication request can be transmitted. As described later in more detail, a parent apparatus beacon frame includes a transmitter ID, a GSN, a user name and the like, and the apparatus names, game names and user names are displayed as a list based on such information.

The player of one game apparatus 1 selects a parent apparatus (e.g., the game apparatus 1P) to play with among the parent apparat uses displayed in the list. Thus, the game apparatus 1 transmits a transmission frame representing a participation request to the selected parent apparatus. When the selected parent apparatus permits the participation, the parent apparatus transmits a transmission frame representing the permission to the game apparatus 1. Thus, the game apparatus 1 is set as a child apparatus (game apparatus 1C1 and game apparatus 1C2). In this manner, the game apparatus 1P accepts the game apparatuses 1C1 and 1C2 and a group of these game apparatuses 1 is formed. When the user of the parent game apparatus 1P makes an input to start the multi-play game, multi-play game processing is executed by the game apparatuses 1P, 1C1 and 1C2 (alternatively, the multi-play game processing may be executed by the user of the game apparatus 1C1 or 1C2 making an input to start the multi-play game). As described later in more detail, in this exemplary embodiment, game apparatuses which can transmit a participation request to the parent apparatus are limited based on a predetermined condition. For example, in the case where a wirelessly communicable area with a game apparatus 1 attempting to transmit a participation request to the parent apparatus encompasses a group of apparatuses involved in a wireless communication or another parent apparatus using the same channel, such a game apparatus 1 may not be able to transmit a participation request to the parent apparatus depending on the priority level of the wireless communication, the radio wave use ratio of the channel or other conditions.

In FIG. 3, the game apparatus 1P may distribute a game program to the game apparatuses 1C1 and 1C2 (or either one of the game apparatuses 1C1 and 1C2). This is realized by processing similar to distribution performed by a game apparatus 1PP shown in FIG. 4 described later. The game apparatuses 1C1 and 1C2 may execute the distributed game program to play the multi-play game with the game apparatus 1P.

FIG. 4 is a conceptual view illustrating a state where one of the game apparatuses 1 located in a wirelessly communicable area is performing a wireless distribution to the other game apparatuses 1. In order to give a specific description, three game apparatuses 1 are assumed to be located in such an area in the following example. The game apparatus 1PP is set as a parent apparatus which performs a wireless distribution, and game apparatuses 1C3 and 1C4 are set as child apparatuses which receive the wireless distribution. The three game apparatuses 1PP, 1C3 and 1C4 have the same structure as the game apparatus 1 described above.

With the form of wireless transmission shown in FIG. 4, the game apparatus 1PP wirelessly distributes a game program, data or the like to the other game apparatuses 1C3 and 1C4. Such a wireless distribution is prioritized over the wireless communication for a multi-play game shown in FIG. 3. For example, the game apparatus 1PP may be connected to an information processing apparatus 9, such as a general personal computer or the like, which is connected to a network. In this case, data existing in the network or in the information processing apparatus 9 may be wirelessly distributed as well as the data stored on the game apparatus 1PP. For performing such a wireless distribution, a group of a plurality of game apparatuses 1 involved in such a wireless distribution is formed. The game apparatus 1 for performing a wireless distribution is set as the parent apparatus (game apparatus 1PP), and the other game apparatuses 1 for receiving the wireless distribution are set as child apparatuses (game apparatus 1C3 and game apparatus 1C4).

The game apparatus 1 for performing a wireless communication selects a channel to be used for the wireless distribution and is set as a distribution parent apparatus which uses the selected channel (parent apparatus for distributing a game program, data or the like to the other game apparatuses; game apparatus 1PP). As described later in more detail, in this exemplary embodiment, game apparatuses which can be a distribution parent apparatus may be limited based on a predetermined condition. For example, in the case where a wirelessly communicable area with a game apparatus 1 to be set as a distribution parent apparatus encompasses a group of apparatuses involved in a wireless communication or another parent distribution apparatus using the same channel, such a game apparatus 1 may not be a parent apparatus depending on the priority level of the wireless communication, the radio wave use ratio of the channel or other conditions. In the case where the distribution parent apparatus is set to have a high priority level and is permitted to co-exist with the other distribution parent apparatuses, such a limitation may be lifted.

When the game apparatus 1PP is set as a distribution parent apparatus, the game apparatus 1PP transmits a parent apparatus beacon frame at a predetermined cycle by broadcast in order to notify the existence of the distribution parent apparatus and particulars thereof. The other game apparatuses 1 located within a wirelessly communicable area with the parent apparatus 1PP receive the distribution parent apparatus beacon frame by channel scan processing. Each game apparatus 1 which has received the distribution parent apparatus beacon frame displays a list of distribution parent apparatuses corresponding to the wireless distribution on a screen thereof and thus notifies a player thereof of the distribution parent apparatuses to which a wireless distribution request can be transmitted.

The player of one game apparatus 1 selects a distribution parent apparatus (e.g., the game apparatus 1PP) to which a distribution request is to be transmitted among the parent apparatuses displayed in the list. Thus, the game apparatus 1 transmits a transmission frame representing a distribution request to the selected distribution parent apparatus. When the selected distribution parent apparatus permits the distribution, the distribution parent apparatus transmits a transmission frame representing the permission to the game apparatus 1. Thus, the game apparatus 1 is set as a child apparatus (game apparatus 1C3 and game apparatus 1C4). The distribution parent apparatus 1PP performs a wireless distribution, so that the game apparatuses 1C3 and 1C4 download the data. The game apparatuses 1 which can transmit the distribution request to the distribution parent apparatus may be limited based on a predetermined condition, like the child apparatuses for transmitting a participation request. In the case where the distribution request to the distribution parent apparatus is treated in a special manner, such a limitation may be lifted.

The form of wireless communication shown in FIG. 3 may also be usable for a wireless distribution of a game program or data (download play). For example, the game program or data owned by the game apparatus 1P is downloaded to the game apparatuses 1C1 and 1C2, and the multi-play game is played using the downloaded game program. In this case, according to certain exemplary embodiments, the wireless communication for downloading the data may be set to have a lower priority level than, or an equal priority level to, the wireless distribution from the distribution parent apparatus shown in FIG. 4.

In the example shown in FIG. 4, the game apparatus 1 performs the wireless distribution. Alternatively, an information processing apparatus having a different structure from that of the game apparatus 1 (e.g., a general personal computer or a dedicated wireless distribution apparatus) may perform the wireless distribution. In this case, the information processing apparatus preferably uses the same communication protocol as that used by the game apparatuses 1 to communicate with the game apparatuses 1. Namely, the information processing apparatus transmits a parent apparatus beacon frame (FIG. 6), a communication permission frame (FIG. 8) or a data frame (FIG. 9), and a communication request frame (FIG. 7) is transmitted to the information processing apparatus.

Figure 5:
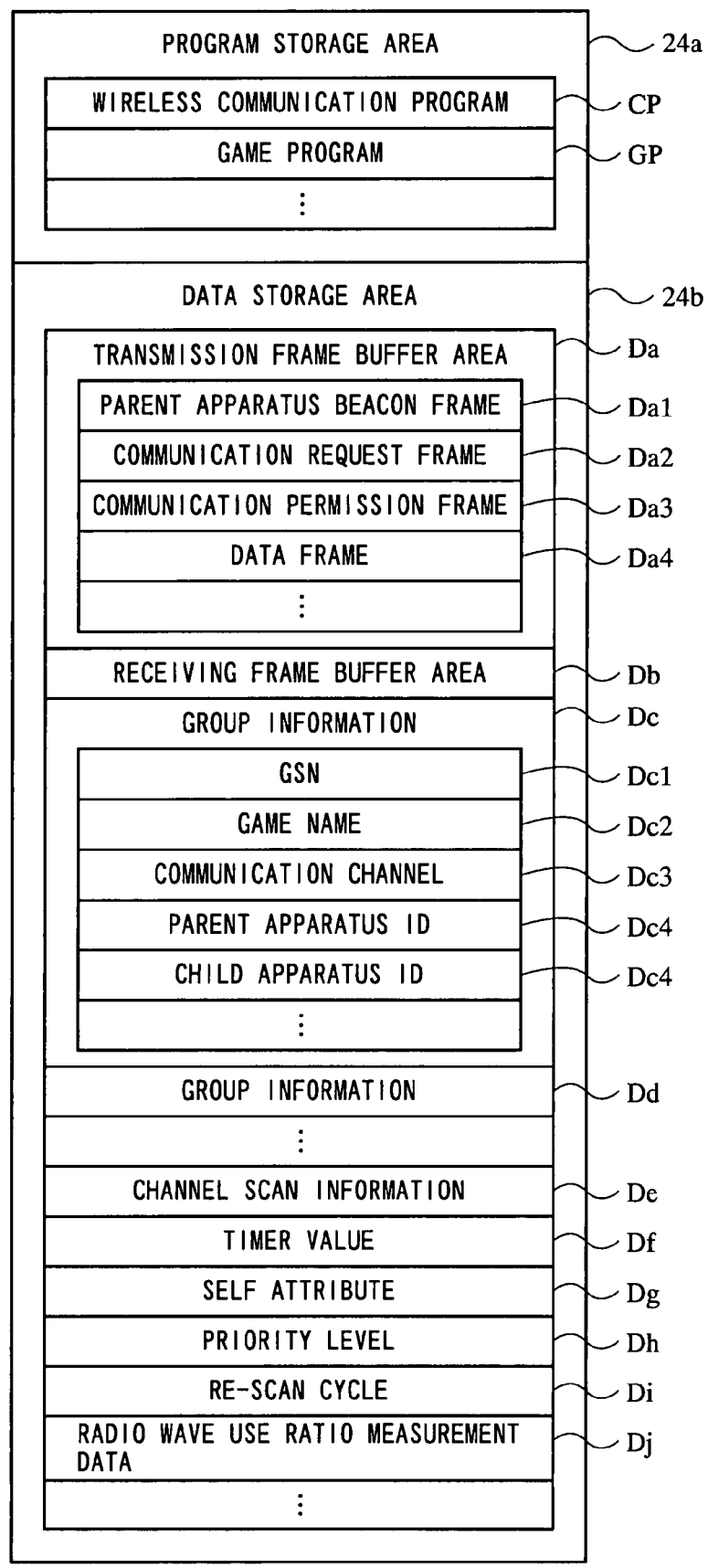
FIG. 5 shows an example of programs and various data stored on a RAM 24 for executing a wireless communication program according to certain exemplary embodiments.

Next, with reference to FIG. 5 through FIG. 10, various programs and various data stored on the RAM 24 will be described. FIG. 5 shows an example of various programs and data stored on the RAM 24 in accordance with the execution of the wireless communication program. FIG. 6 shows an example of parent apparatus beacon frame. FIG. 7 shows an example of communication request frame. FIG. 8 shows an example of communication permission frame. FIG. 9 shows an example of data frame. FIG. 10 shows an example of channel scan information.

As shown in FIG. 5, the RAM 24 has stored thereon programs read from the ROM 17a, programs built in the game apparatus 1, programs downloaded from other apparatuses, temporary data generated by the game apparatus 1, and the like. As shown in FIG. 5, in a program storage area 24a of the RAM 24, a wireless communication program CP, a game program GP and the like are stored. The wireless communication program CP defines the entirety of the wireless communication processing. By starting the execution of the wireless communication program CP, the wireless communication processing is started. The game program GP defines the entirety of the game processing execution by the game apparatus 1. For example, for executing a game stored on the memory card 17 mounted on the game apparatus 1, the game program GP is read from the ROM 17a. For executing a game downloaded from another game apparatus (download play), the game program GP is downloaded from the another game apparatus based on the wireless communication program CP.

In a data storage area 24b of the RAM 24, a transmission frame buffer area Da and a receiving frame buffer area Db are set, and group information Dc, Dd, . . . , channel scan information De, a timer value Df, self attribute Dg, a priority level Dh, a re-scan cycle Di, radio wave use ratio measurement data Dj and the like are stored.

The transmission frame buffer area Da stores a parent apparatus beacon frame Da1, a communication request frame Da2, a communication permission frame Da3, a data frame Da4 and the like. For allowing the game apparatus 1 to transmit data to another game apparatus, a transmission frame provided in the transmission frame buffer area Da is used. The receiving frame buffer area Db is a buffer frame for temporarily storing a transmission frame received from another game apparatus 1. Hereinafter, with reference to FIG. 6 through FIG. 9, a structure of each transmission frame will be described.

FIG. 6 shows an example of parent apparatus beacon frame. The parent apparatus beacon frame includes a frame type F_TYP, a transmitter ID, a GSN, a priority level, and a re-scan cycle. The frame type F_TYP represents the type of the transmission frame. In this example, information representing that this frame is a parent apparatus beacon frame is described as the frame type F_TYP. As the transmitter ID, a self ID owned by the game apparatus 1 which is the transmitter of the parent apparatus beacon frame is described. As the GSN, the serial number of the game which is being executed, which has been started, which is executable, or which is distributable by the game apparatus 1 which is the transmitter of the parent apparatus beacon frame is described. Namely, the GSN described in the parent apparatus beacon frame is the game serial number of a game program stored on the memory card 17 currently mounted on the game apparatus 1 as the transmitter, or the game serial number of a game program distributable from the game apparatus which is the transmitter. The priority level is information representing the priority level of the communication performed by the game apparatus 1 which is the transmitter of the parent apparatus beacon frame. For example, any one of four stages of "0" through "3" is described as the priority level. A higher numerical value represents a higher priority level. The numerical value of "0" represents the lowest priority level, and the numerical value of "3" represents the highest priority level. In this exemplary embodiment, the priority level of "3" is set for the distribution parent apparatus, and any one of the priority levels of "0" through "2" is set for the parent apparatus for the multi-play game in accordance with the priority level of the game. Alternatively, the priority level of "2" may be set for the distribution parent apparatus, and the priority level of "3" may be saved for some other special use. In this case, the priority level of "3" may be used for a communication fight game played by a plurality of game apparatuses 1 in a game show or the like, and may be set for the game apparatuses 1 or a program in a memory card 17 mounted on the game apparatuses 1.

The re-scan cycle represents a cycle for performing channel scan processing described later. The re-scan cycle is described for allowing the game apparatus 1 which is the transmitter of the parent apparatus beacon frame to notify the other game apparatuses 1 of such a cycle. The re-scan cycle is selected from the following.

0: to be confirmed each time
    1: at an interval of 5 minutes
    2: at an interval of 1 hour
    3: no re-scan (reconfirmation is not performed and the channel is not usable until the power is turned off)

The parent apparatus beacon frame may include group information Dc of the group to which the game apparatus which is the transmitter belongs (the group information Dc also includes information regarding the child apparatuses included in the group; will be described later in detail).

The parent apparatus beacon frame may include the user name data or the apparatus name data. In this exemplary embodiment, a mobile game apparatus 1' which does not embody the certain exemplary embodiments described herein (a conventional mobile game apparatus or a mobile game apparatus for executing a conventional game program) and a game apparatus 1 embodying the certain exemplary embodiments described herein (a mobile game apparatus according to the present invention or a mobile game apparatus game for executing a game program according to the certain exemplary embodiments described herein) may be used together. In other words, a mobile game apparatus 1' may be a parent apparatus while a mobile game apparatus 1 is a child apparatus. Alternatively, a mobile game apparatus may be a parent apparatus while a mobile game apparatus 1' is a child apparatus. Still alternatively, a game program or data distributed from a distribution parent apparatus may be received by a mobile game apparatus 1 and a mobile game apparatus 1'. In the case where a mobile game apparatus 1' is a parent apparatus, the mobile game apparatus 1' transmits the parent apparatus beacon frame but with no data on the "priority level" and with no data on the "re-scan cycle". In the case where a mobile game apparatus 1' is a child apparatus, the mobile game apparatus 1' transmits the same communication request frame as described later. In the case where a mobile game apparatus 1' is a parent apparatus, the mobile game apparatus 1' transmits the same communication permission frame as described later and also the same data frame as described later.

The parent apparatus beacon frame is transmitted from all the game apparatuses 1 set as the parent apparatuses (all of the parent apparatuses and the distribution parent apparatuses) periodically at a cycle of a predetermined time period (e.g., at a cycle of 200 ms). The parent apparatus beacon frame is transmitted by broadcast with no addressee described. Namely, the parent apparatus beacon frame is transmitted to all the game apparatuses 1 located in the communicable area.

FIG. 7 shows an example of communication request frame. When a game apparatus 1 which received the parent apparatus beacon frames wishes to communicate with the parent apparatus represented by any of the parent apparatus beacon frames, the communication request frame is transmitted from the game apparatus 1 to such a parent apparatus. The communication request frame includes a frame type F_TYP, an addressee ID, and a transmitter ID. As the frame type F_TYP, information representing that this frame is a communication request frame is described. As the addressee ID, the self ID of the game apparatus 1 to which the communication is requested is described. As the transmitter ID, the self ID of the game apparatus 1 which is the transmitter of the communication request frame is described.

FIG. 8 shows an example of communication permission frame. The communication permission frame is transmitted by the parent apparatus 1 which received the communication request frame to the game apparatus 1 which transmitted the communication request frame. The communication permission frame includes a frame type F_TYP, an addressee ID, a transmitter ID, a result, and group information. As the frame type F_TYP, information representing that this frame is a communication permission frame is described. As the addressee ID, the self ID of the game apparatus 1 which transmitted the communication request frame is described. As the transmitter ID, the self ID of the game apparatus 1 which is the transmitter of the communication permission frame is described. The result is whether or not the communication with the game apparatus 1 which transmitted the communication request frame is permitted. The group information is information on the group including the game apparatus 1 which transmitted the communication permission frame (described later), and includes the GSN, game name, parent apparatus ID, child apparatus name and the like regarding the group.

FIG. 9 shows an example of data frame. The data frame is transmitted or received, for example, between the game apparatuses 1 which have started the multi-play game or the like, or between a distribution parent apparatus and a child apparatus. The data frame includes a frame type F_TYP, an addressee ID, a transmitter ID, and data. As the frame type F_TYP, information representing that this frame is a data frame is described. As the addressee ID, the self ID of the game apparatus 1 which is the addressee of the data frame is described. As the transmitter ID, the self ID of the game apparatus 1 which is the transmitter of the data frame is described. As the data, game data, a game program or the like to be transmitted or received is described.

Returning to FIG. 5, the group information Dc, Dd, . . . , is information regarding the group of game apparatuses 1 located in the communicable area, and includes the GSN, game name, communication channel, parent apparatus ID, child apparatus ID and the like regarding such a group. For example, the group information Dc includes a GSN Dc1, a game name Dc2, a communication channel Dc3, a parent apparatus ID Dc4, a child apparatus ID Dc5 and the like regarding the group. The GSN Dc1 and the game name Dc2 represent the type of the game to be played or downloaded by the group. The communication channel Dc3 represents the channel used by the group for the wireless communication. The parent ID Dc4 represents the self ID of the game apparatus 1 which is set as the parent apparatus of the group. The child ID Dc5 represents the self ID of the game apparatus 1 which is set as a child apparatus of the group. When information on a child apparatus of the other group which does not include its own game apparatus is not available from the parent apparatus beacon frame or the like, it is not necessary to describe the child information ID Dc5 in the group information regarding such a group. In this case, the child information ID Dc5 is described only in the group information regarding the group including its own game apparatus. In the case where there are a plurality of child apparatuses in the group, a plurality of child IDs Dc5 are described in the group information Dc.

As the channel scan information De, information obtained by channel scan processing is described. Hereinafter, with reference to FIG. 10, an example of channel scan processing will be described.

As shown in FIG. 10, channel scan information De is obtained by executing channel scan processing on each of channels usable in a wireless information or a wireless distribution (e.g., each of channels Ch1, Ch7 and Ch13 conforming to the wireless LAN standards of IEEE802.11b). The channel scan information is obtained by receiving all the parent apparatus beacon frames receivable in each channel and analyzing the contents described therein. As shown in FIG. 10, the channel scan information on each channel includes parent apparatuses (parent apparatus IDs) transmitting a parent apparatus beacon frame, the priority level of each parent apparatus (parent apparatus priority level PLV), the highest priority level among those of the parent apparatuses (channel priority level ChLV; i.e., the highest priority level among the priority levels in the channel), the re-scan cycle designated by the parent apparatus having the highest priority level in the channel, and immediately previous time at which the channel scan processing was executed (previous scan time).

In the example shown in FIG. 10, parent apparatuses P1 through P3 each transmit a parent apparatus beacon frame to channel Ch1. The parent apparatus priority level PLV of each parent apparatus is "0". Accordingly, the channel priority level ChLV of channel Ch1 is set to "0". Regarding channel Ch1, the re-scan cycle of 5 minutes and the previous scan time of 15:10 are described.

To channel Ch7, parent apparatuses P6 through P8 each transmit a parent apparatus beacon frame. The parent apparatus priority level PLV of parent apparatus P7 is "1", and the parent apparatus priority level PLV of each of parent apparatuses P6 and P8 is "0". Accordingly, the channel priority level ChLV of channel Ch7 is set to "1". Regarding channel Ch7, the re-scan cycle of 1 hour and the previous scan time of 15:00 are described.

To channel Ch13, only parent apparatus PP1 transmits a parent apparatus beacon frame. The parent apparatus priority level PLV of parent apparatus PP1 is "3". Accordingly, the channel priority level ChLV of channel Ch13 is set to "3". Regarding channel Ch13, the re-scan cycle of no re-scan and the previous scan time of 13:30 are described. Since parent apparatus PP1 is a distribution parent apparatus, the highest priority level of "3" is set, and accordingly, the channel priority level of "3" is set.

Specifically in the example shown in FIG. 10, the following parent apparatus beacon frames are transmitted to the channel Ch1.

(1) A parent apparatus beacon frame in which the transmitter ID is "P1", the priority level is "0", and the re-scan cycle is "5 minutes".

(2) A parent apparatus beacon frame in which the transmitter ID is "P2", the priority level is "0", and the re-scan cycle is "5 minutes".

(3) A parent apparatus beacon frame in which the transmitter ID is "P3", the priority level is "0", and the re-scan cycle is "5 minutes".

To the channel Ch7, the following parent apparatus beacon frames are transmitted.

(1) A parent apparatus beacon frame in which the transmitter ID is "P6", the priority level is "0", and the re-scan cycle is "5 minutes".

(2) A parent apparatus beacon frame in which the transmitter ID is "P7", the priority level is "1", and the re-scan cycle is "1 hour".

(3) A parent apparatus beacon frame in which the transmitter ID is "P8", the priority level is "0", and the re-scan cycle is "5 minutes".

To the channel Ch13, the following parent apparatus beacon frame is transmitted.

(1) A parent apparatus beacon frame in which the transmitter ID is "PP1", the priority level is "3", and the re-scan cycle is "no re-scan".

When no parent apparatus beacon frame is received in a channel, a predetermined time period (e.g., 5 minutes) is set as the re-scan cycle of the channel scan information De. When a parent apparatus beacon frame with no priority level is received (e.g., a conventional game apparatus with no priority level being set transmits a parent apparatus beacon frame), the parent apparatus priority level PLV is set to the lowest level (i.e., PLV="0") in the channel scan information De. In this manner, a wireless communication with a conventional game apparatus which does not embody the certain exemplary embodiments described herein can also be managed by the channel scan information.

Figure 11:
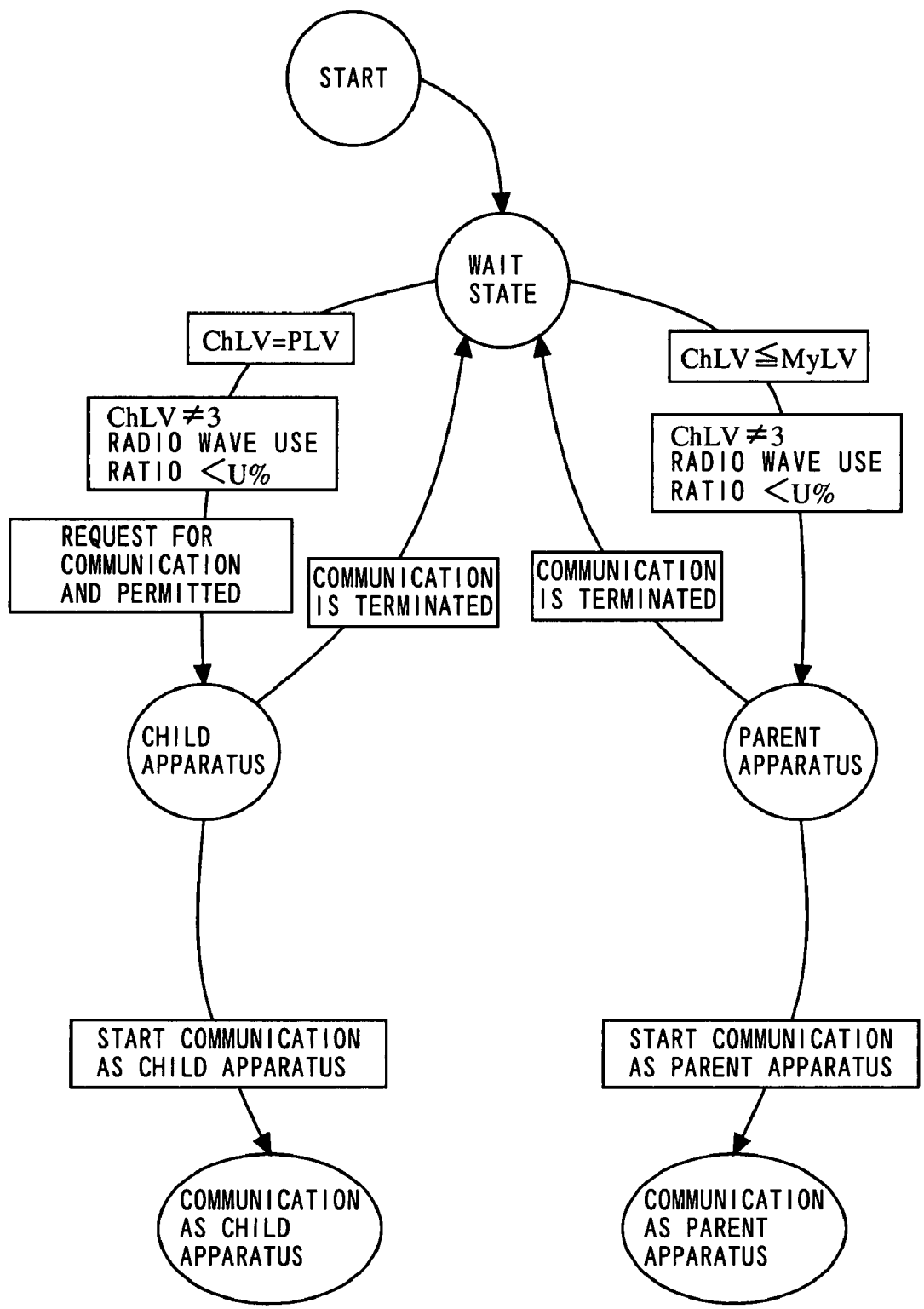
FIG. 11 is a state transfer diagram showing a transfer of self attribute Dg which is set in the game apparatus 1.

Returning to FIG. 5, as the timer value Df, count information such as the current time or the like is described. As the self attribute Dg, attribute representing whether its own game apparatus is a parent apparatus, a child apparatus or in a wait state is described. The parent apparatus is an apparatus which plays a main role in the group during the process of forming a group for multi-play game or download play, and a child apparatus is an apparatus which plays a subordinate role. However, the "parent apparatus" herein does not mean that the game apparatus plays a main role in the game processing after the multi-play game is started, and the "child apparatus" does not mean that the game apparatus plays a subordinate role in the game processing. A game apparatus in the wait state is an independent game apparatus which is not included in any group. Hereinafter, with reference to FIG. 11, the self attribute Dg which is set for a game apparatus 1 will be described. FIG. 11 is a state transfer diagram illustrating a transfer of the self attribute Dg which is set for a game apparatus 1.

As shown in FIG. 11, immediately after start, the self attribute Dg is set to a wait state in all the game apparatuses 1. When the user of a game apparatus 1 which is set to the wait state makes an operation to start a communication game, the self attribute Dg of such a game apparatus 1 is set to a parent apparatus, and the game apparatus 1 becomes a parent apparatus. Unless a predetermined condition is fulfilled, the game apparatus 1 cannot be a parent apparatus. The predetermined condition is, for example, that the priority level of the game apparatus 1 is equal to or higher than the channel priority level, or that the priority level of the game apparatus 1 is lower than the channel priority level but the channel priority level is lower than "3" and the radio wave use ratio is lower than U %. The conditions will be described later in detail. When the game apparatus 1 is set as the parent apparatus, the game apparatus 1 starts a communication with a child apparatus which is set in the next processing (starts playing a game or starts downloading). When the game apparatus 1 which is set as the parent apparatus terminates the communication with another apparatus, the self attribute Dg of the game apparatus 1 is changed from the parent apparatus to the wait state.

When the user of a game apparatus 1 which is set to the wait state requests another game apparatus for a communication and obtains a permission, the self attribute Dg of the game apparatus 1 is set to a child apparatus, and the game apparatus 1 becomes a child apparatus. Unless a communication state when the communication is requested fulfills a predetermined condition, the communication request cannot be transmitted to the parent apparatus. The predetermined condition is, for example, that the priority level of the parent apparatus is equal to the channel priority level, or that the priority level of the game apparatus 1 requesting a communication is lower than the channel priority level but the channel priority level is lower than "3" and the radio wave use ratio is lower than U %. The conditions will be described later in detail. When the game apparatus 1 is set as the child apparatus, the game apparatus 1 starts a communication with the parent apparatus (starts playing a game or starts downloading). When the game apparatus 1 which is set as the child apparatus terminates the communication with the parent apparatus, the self attribute Dg of the game apparatus 1 is changed from the child apparatus to the wait state.

Returning to FIG. 5, as the priority level Dh, information representing the priority level of the wireless communication performed by its own game apparatus, or the priority level of the wireless communication to be started by its own game apparatus, is described. As described above, as the priority level Dh, any one of the four stages of "0" through "3" is described, for example. When its own game apparatus is the parent apparatus, the priority level Dh is set as the "priority level" in the parent apparatus beacon frame. For comparing its own priority level and the channel level as described later (FIG. 13), the priority level Dh is used as its own priority level. A higher numerical value represents a higher priority level. The numerical value of "0" represents the lowest priority level, and the numerical value of "3" represents the highest priority level. As the re-scan cycle Di, information for notifying another apparatus of the cycle for executing the channel scan processing is described. When its own game apparatus is the parent apparatus, the re-scan cycle Di is described as the "re-scan cycle" in the parent apparatus beacon frame. As the radio wave use ratio measurement data Dj, information representing the measurement result of the radio wave use ratio of each channel is described.

Figure 12:
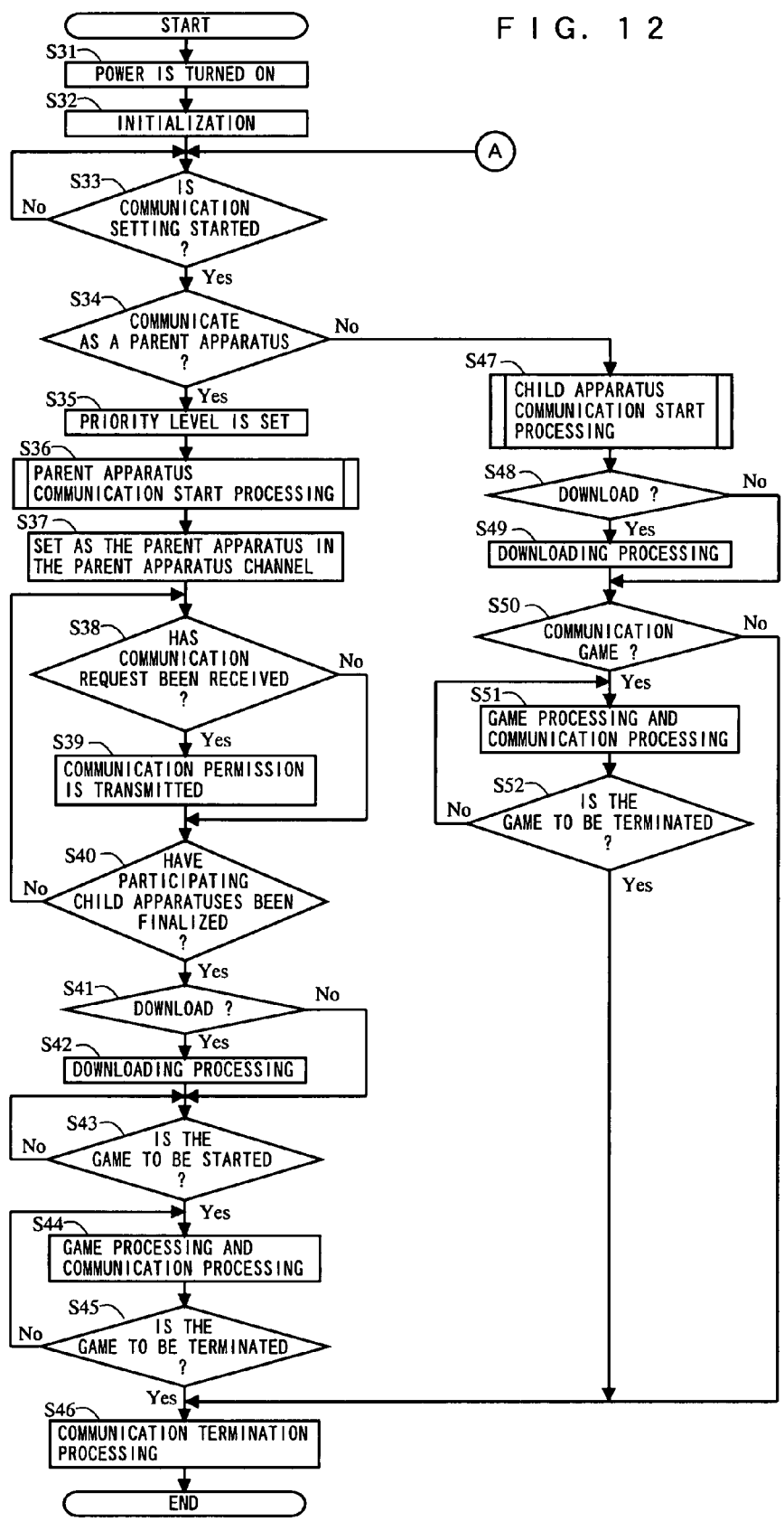
FIG. 12 is a flowchart illustrating a wireless communication operation performed by the game apparatus 1 by executing the wireless communication program according to certain exemplary embodiments.
Figure 13:
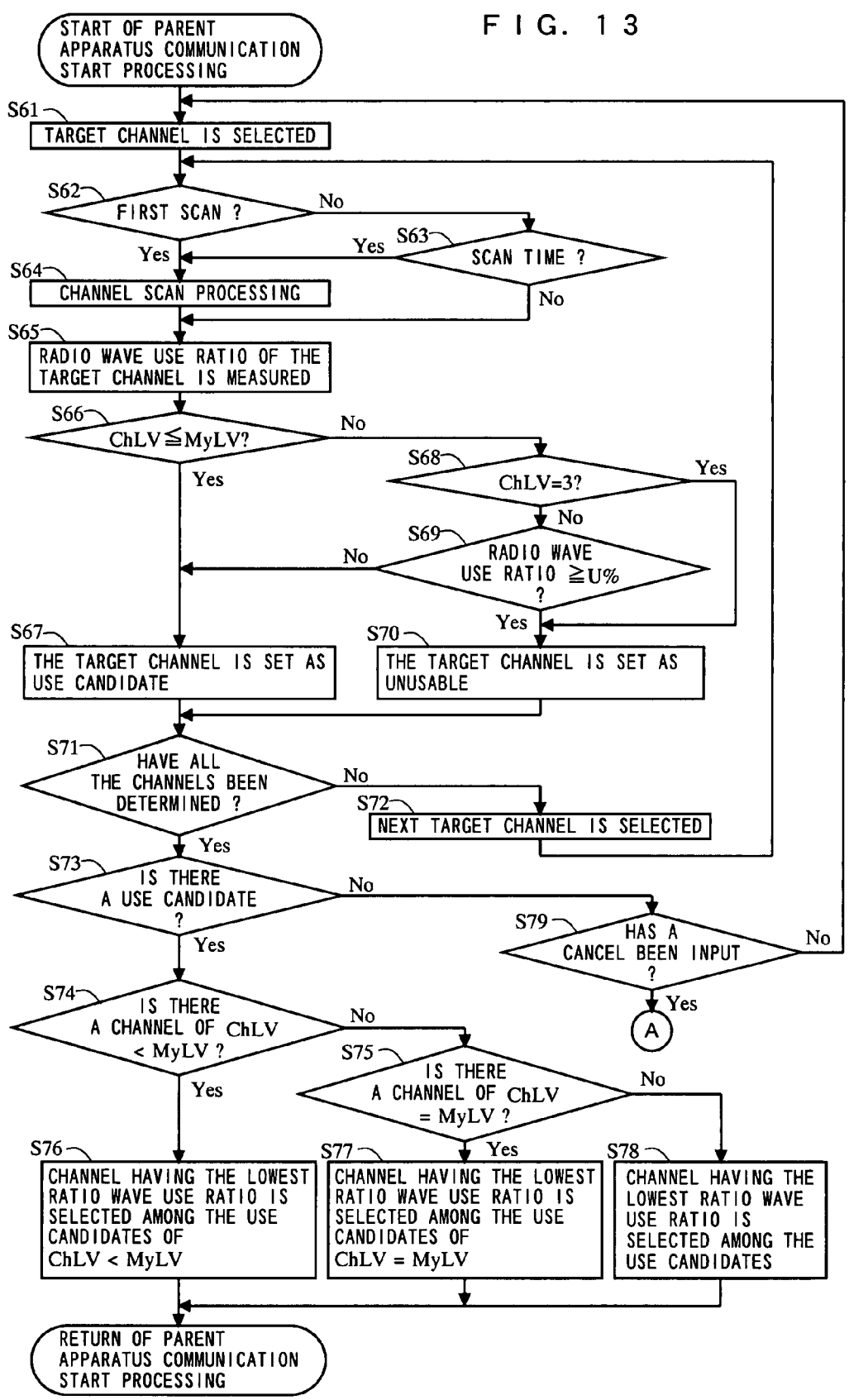
FIG. 13 shows a subroutine of parent apparatus communication start processing in step 36 in FIG. 12 in detail.
Figure 14:
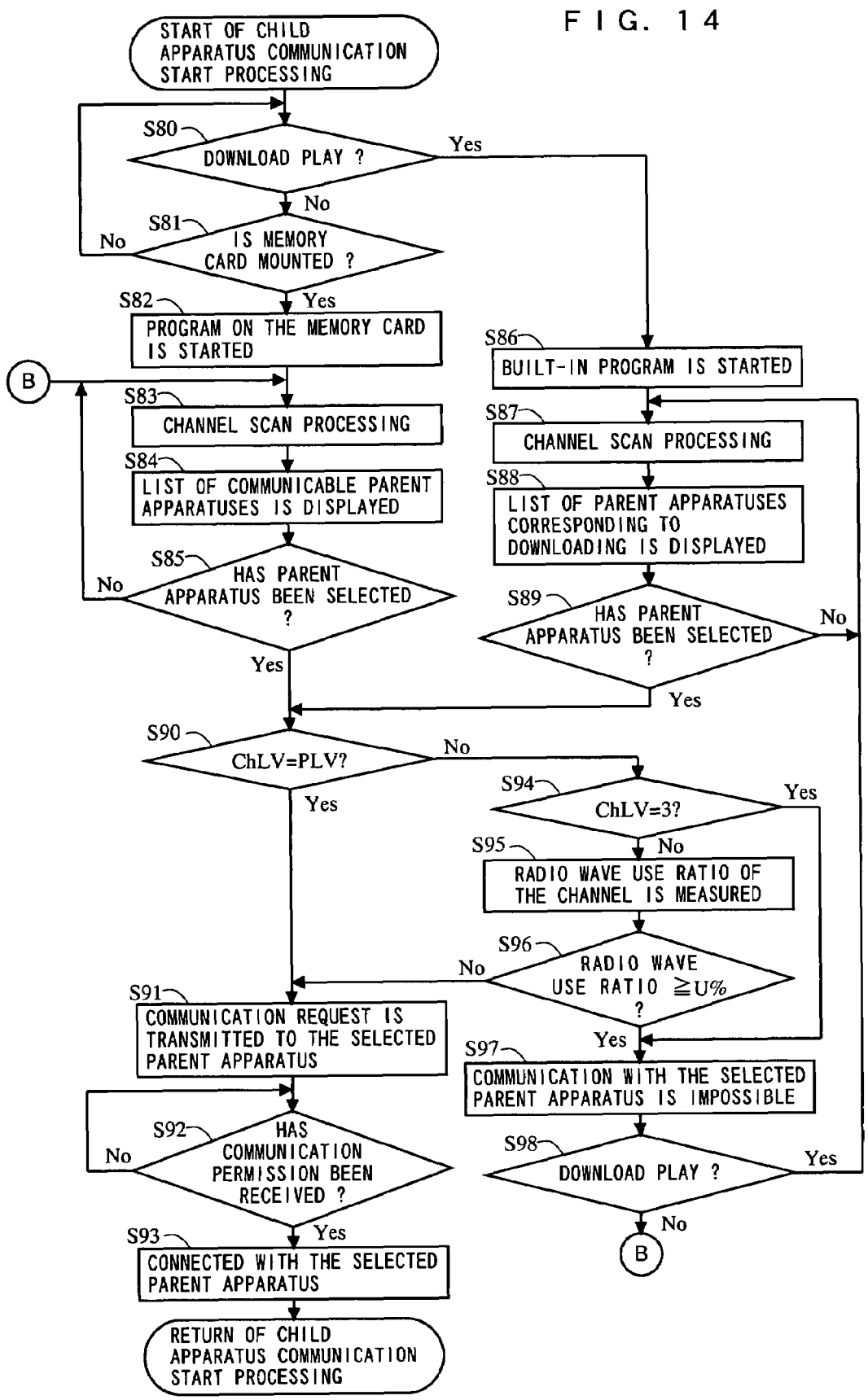
FIG. 14 shows a subroutine of child apparatus communication start processing in step 47 in FIG. 12 in detail.
Figure 15:
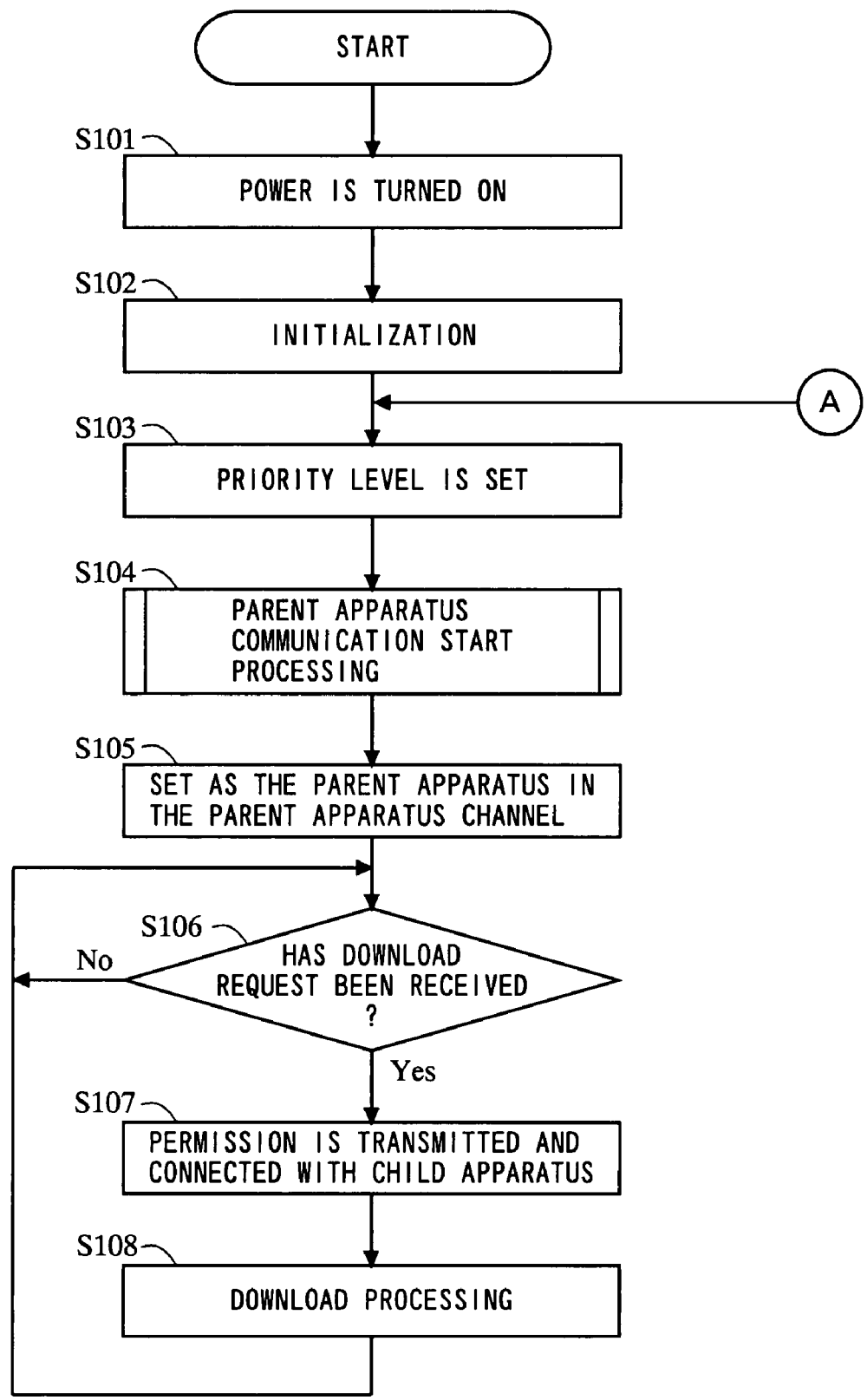
FIG. 15 is a flowchart illustrating a wireless distribution operation performed by a dedicated download apparatus such as a game apparatus 1PP shown in FIG. 4 by executing the wireless communication program according to certain exemplary embodiments.

With reference to FIG. 12 through FIG. 15, a specific processing operation performed by the wireless communication program with the game apparatus 1 will be described. FIG. 12 a flowchart illustrating an operation of wireless communication performed by the game apparatus 1 by executing a wireless communication program according to the certain exemplary embodiments described herein. FIG. 13 shows a subroutine of parent apparatus communication start processing in step 36 in FIG. 12 in detail. FIG. 14 shows a subroutine of child apparatus communication start processing in step 47 in FIG. 12 in detail. FIG. 15 is a flowchart illustrating an operation of wireless distribution performed by an apparatus dedicated to distribution, such as the game apparatus 1PP shown in FIG. 4, by executing the wireless communication program. The flowchart shown in FIG. 12 illustrates the processing executed by a parent apparatus and a child apparatus for playing a communication game and a child apparatus for receiving service data. More specifically, the flowchart shown in FIG. 12 is applied to a parent apparatus and a child apparatus for playing a communication game based on a game program stored on the memory card 17 mounted thereon, a child apparatus for playing a communication game based on a game program downloaded from the memory card 17 mounted on a parent apparatus, and a child apparatus for playing a communication game based on a game program downloaded from a game apparatus dedicated for providing data to be downloaded. The flowchart shown in FIG. 15 illustrates the processing executed by a game apparatus dedicated for providing service data to be downloaded. The programs for executing such processing is stored on the ROM 17a. Alternatively, the programs for executing such processing may be built in a predetermined nonvolatile storage area of the game apparatus 1 and may be read onto the ROM 24 from the ROM 17a or the like to be executed by the CPU core 21 when the power of the game apparatus 1 is turned on. The program for executing the processing in steps 31 through 34 and steps 47 through 50 may be stored in a predetermined nonvolatile storage area of the game apparatus 1. In this case, the processing in step 50 and thereafter is executed by the downloaded program.

The conventional game apparatus 1' executes the flow substantially the same as that shown in FIG. 12 through FIG. 14. Unlike the game apparatuses 1 according to certain exemplary embodiments, the conventional game apparatus 1' performs as follows when the game apparatus 1' is the parent apparatus. In FIG. 12, after step 34, the game apparatus 1' measures the radio wave use ratio of each channel and selects the channel having the lowest radio wave use ratio. Then, the processing is advanced to step 38. After that, the flow is the same as that in FIG. 12. The conventional game apparatus 1' performs as follows when the game apparatus 1' is the child apparatus. After step 85 or S89 in FIG. 14, the processing is advanced to step 91.

Now, the processing will be described with reference to FIG. 12. When the power (not shown) of the game apparatus 1 is turned on, the CPU core 21 executes a boot program (not shown) to load a wireless communication program CP stored on the memory card 17 or built in the game apparatus 1 onto the RAM 24 (step 31). The loaded wireless communication program CP is executed by the CPU core 21 to perform the steps shown in FIG. 12 (the steps are simply represented as "S" in FIG. 12 through FIG. 15).

The CPU core 21 executes initialization processing (step 32) for the wireless communication processing, and advances the processing to the next step. For example, the CPU core 21 sets the self attribute Dg to the wait state, and initializes the group information Dc, the channel scan information De and the like. As a part of the initialization processing, the CPU core 21 starts the timer for counting the current time or the like and thus starts updating the timer value Df. The timer value Df is updated as the time passes in the following processing.

The CPU core 21 waits for an instruction to start communication settings (step 33). When an instruction to start communication settings is received, the CPU core 21 advances the processing to step 34. For example, the CPU core 21 starts communication settings in accordance with an operation input by the player. A game program for self play and a game program for communication play may be stored on the memory card 17, so that the player can select which program is to be executed using a menu screen. In this case, it may be determined in step 33 that the game program for communication play has been selected.

In step 34, the CPU core 21 determines whether or not the game apparatus 1 is to communicate as a parent apparatus. When the game apparatus 1 is to communicate as a parent apparatus, the CPU core 21 advances the processing to step 35. When the game apparatus 1 is to communicate as a child apparatus, the CPU core 21 advances the processing to step 47. For this determination, the CPU core 21 may execute the following processing. The CPU core 21 allows the player to select, with the menu screen, whether to start a new communication game or to participate in a communication game already started by another game apparatus. When the player selects to start a new communication game, it is determined that the game apparatus 1 will communicate as a parent apparatus. When the player selects to participate in a communication game already started by another game apparatus, it is determined that the game apparatus 1 will communicate as a child apparatus.

In step 35, the CPU core 21 reads priority level information which is set for its own game apparatus or priority level information buried in the game program. Based on the priority level information, the CPU core 21 sets the priority level for the wireless communication and describes the priority level as the priority level Dh. Then, the processing is advanced to the next step.

For example, in a game show venue, a store or the like, the CPU core 21 sets the priority level of a wireless communication for distributing a game program or data to the game apparatus 1 of the user, or the priority level of a wireless communication for playing a communication game having a high priority level (e.g., a representative communication game performed in a presentation), to be relatively high. The CPU core 21 sets the priority level of a wireless communication for a communication game played among general players to be lowest. It is preferable that the priority level is set to be unchangeable by the player arbitrarily. Specifically, the priority level of a wireless communication in a special form is set to be higher than the priority level of a general wireless communication. Therefore, a game apparatus 1 or a game program for a special wireless communication is set to a higher priority level in a fixed manner (e.g., to the priority level "3"). For example, a game apparatus 1 for a special wireless communication is set to a preset priority level (i.e., priority level information with a higher priority level is stored on the internal, preferably nonvolatile, memory of such a game apparatus 1), or a game program for a special wireless communication is set to a preset priority level (i.e., priority level information with a higher priority level is included in such a game program). By such settings, each of the users at a game show venue, store or the like cannot arbitrarily change the priority level, and a high priority level can be assigned to only an intended, special wireless communication. When such a special effect is not expected, the priority level of a wireless communication may be selected by the player operating the game apparatus 1.

Next, the CPU core 21 executes parent apparatus communication start processing (step 36) and advances the processing to the next step. Hereinafter, with reference to FIG. 13, the parent apparatus communication start processing will be described in detail.

Referring to FIG. 13, the CPU core 21 selects one of the channels usable for a wireless communication or a wireless distribution (e.g., one of the channels Ch1, Ch7 and Ch13 conforming the wireless LAN standards of IEEE802.11b) as a determination target channel. The CPU core 21 determines whether or not no scan has been performed yet (step 62) and whether or not it is time to scan (step 63) regarding the determination target channel. When no scan has been performed yet (Yes in step 62) or when it is time to scan (Yes step 63), the CPU core 21 performs channel scan processing (step 64) on the determination target channel and advances the processing to step 65. When the scan has already been performed (No in step 62) or when it is not the time to scan (No step 63), the CPU core 21 advances the processing to step 65. In step 62, when, for example, the previous scan time is not set in the channel scan information De for the determination target channel, the CPU core 21 determines that no scan has been performed yet. In step 63, when, for example, the time period from the previous scan time described in the channel scan information De of the determination target channel until the current time represented by the timer value Df is longer than the time period described as the re-scan cycle in the channel scan information De, the CPU core 21 determines that it is time to scan.

Now, the channel scan processing in step 64 will be described. Based on the received parent apparatus beacon frame (FIG. 6), the CPU core 21 updates the channel scan information De and the group information Dc, Dd, . . . . The CPU core 21 attempts to receive all the receivable parent apparatus beacon frames regarding the determination target channel for a predetermined time period. Based on the parent apparatus beacon frames received during the predetermined time period, the CPU core 21 updates the parent apparatuses ID and the parent apparatus priority levels PLV of the determination target channel in the channel scan information De (FIG. 10). When a parent apparatus beacon frame does not describe any priority level, the CPU core 21 sets the parent apparatus priority level PLV corresponding to the parent apparatus beacon frame to the lowest level "0". Then, the CPU core 21 updates the channel priority level ChLV of the determination target channel with the highest priority level among the updated parent apparatus priority levels PLV. The CPU core 21 updates the channel scan information De of the determination target channel with the re-scan cycle data described in the parent apparatus beacon frame transmitted from the parent apparatus having the highest priority data. When no parent apparatus beacon frame regarding the determination target channel is transmitted, the CPU core 21 sets the re-scan cycle of the determination target channel to a fixed value (e.g., 5 minutes). The CPU core 21 updates the channel scan information De of the determination target channel by referring to the timer value Df and setting the current time to the previous scan time. The CPU core 21 updates the group information Dc, Dd, . . . regarding the group using the determination target channel based on the received parent apparatus beacon frame.

In step 65, the CPU core 21 measures the radio wave use ratio of the determination target channel to update the radio wave use ratio measurement data Dj. For example, the radio wave use ratio is obtained by receiving the radio wave of the determination target channel for a predetermined time period and measuring the ratio of the time period in which a carrier signal is transmitted or measuring the ratio of the time period in which a radio wave of a certain strength or higher is transmitted. The CPU core 21 refers to the channel priority level ChLV described in the channel scan information De regarding the determination target channel and a priority level MyLV described as its own priority level Dh to determine whether or not the priority level MyLV is equal to or higher than the channel priority level ChLV (step 66). When the priority level MyLV is equal to or higher than the channel priority level ChLV, the CPU core 21 sets the determination target channel as a use candidate (specifically, temporarily stores such a setting on the RAM 24) (step 67), and advances the processing to step 71. When the priority level MyLV is lower than the channel priority level ChLV, the CPU core 21 advances the processing to step 68.

When the priority level MyLV is lower than the channel priority level ChLV, the CPU core 21 determines whether or not the channel priority level ChLV of the determination target channel is "3" (step 68) and whether or not the radio wave use ratio of the determination target channel (value measured in step 65) is equal to or higher than U % (step 69). When the channel priority level ChLV is lower than "3" (No in step 68) and further the radio wave use ratio is lower than U % (No in step 69), the CPU core 21 sets the determination target channel as a use candidate (step 67) and advances the processing to step 71. When the channel priority level ChLV is "3" (Yes in step 68) or when the channel priority level ChLV is not "3" but the radio wave use ratio of the determination target channel is equal to or higher than U % (Yes in step 69), the CPU core 21 sets the determination target channel as unusable (specifically, temporarily stores such a setting on the RAM 24) (step 70), and advances the processing to step 71.

For example, even if a parent apparatus having a high priority level is transmitting a parent apparatus beacon frame using a channel, the communication game may not have been started for the reason that, for example, no child apparatus has requested the parent apparatus for a communication. In such a case, it may be preferable that the channel is made usable for a parent apparatus having a lower priority level. This is why the determination is made based on the radio wave use ratio. Now, "U %" which is a threshold for making a determination based on the radio wave use ratio will be described. For example, the U % is set to be lower than the radio wave use ratio when input data or a game parameter is communicated after a communication game is started (radio wave use ratio during communication game execution) or the radio wave use ratio when a game program or data is distributed from a distribution parent apparatus or the like (radio wave use ratio during distribution execution). For example, when it is found that the radio wave use ratio during the communication game execution or the radio wave use ratio during the distribution execution is about 15% or higher, U % is set to U %=10%.

In step 71, the CPU core 21 determines whether or not all the channels usable for the wireless communication or the wireless distribution have been selected as the determination target channel. When there is still a channel which has not been selected, the CPU core 21 selects such a channel as a determination target channel (step 72) and returns the processing to step 62 for repeating the above-described processing. When all the channels usable for the wireless communication or the wireless distribution have been selected as the determination target channel, the CPU core 21 advances the processing to step 73. In this manner, the determination in steps 62 through 70 is made for each of the channels Ch1, Ch7 and Ch13 sequentially.

In step 73, the CPU core 21 determines whether or not at least one determination target channel has been set as a use candidate. When at least one determination target channel has been set as a use candidate, the CPU core 21 determines whether or not at least one of the use candidate(s) has a channel priority level ChLV lower than the priority level MyLV (step 74) and whether or not at least one of the use candidate(s) has a channel priority level ChLV equal to the priority level MyLV (step 75). When at least one of the use candidate(s) has a channel priority level ChLV lower than the priority level MyLV (Yes in step 74), the CPU core 21 sets, as the parent apparatus channel, the channel having the lowest radio wave use ratio among the use candidate(s) having such a channel priority level (step 76), and terminates the processing in this subroutine. When none of the use candidate(s) has a channel priority level ChLV lower than the priority level MyLV (No in step 74) but at least one of the use candidate(s) has a channel priority level ChLV equal to the priority level MyLV (Yes in step 75), the CPU core 21 sets, as the parent apparatus channel, the channel having the lowest radio wave use ratio among the use candidate(s) having such a channel priority level (step 77), and terminates the processing in this subroutine. When none of the use candidate(s) has a channel priority level ChLV lower than the priority level MyLV (No in step 74) and none of the use candidate(s) has a channel priority level ChLV equal to the priority level MyLV (No in step 75), the CPU core 21 sets, as the parent apparatus channel, the channel having the lowest radio wave use ratio among the use candidate(s) (step 78), and terminates the processing in this subroutine.

When no determination target channel has been set as a use candidate (No in step 73), the CPU core 21 determines whether or not the player of the game apparatus 1 has made an input to cancel the communication setting (step 79). When there is such an input, the CPU core 21 returns the processing to step 33 (FIG. 12) for repeating the above-described processing. When there is no such input, the CPU core 21 returns the processing to step 61 for repeating the above-described processing. For example, when no determination target channel has been set as a use candidate (No in step 73), the CPU core 21 may display that the communication game cannot be currently executed on the screen to urge the player to cancel the communication setting, so that when such a cancel is input, it can be determined Yes in step 79.

Returning to FIG. 12, after the parent apparatus communication star processing, the CPU core 21 sets its own game apparatus as the parent apparatus for the parent apparatus channel (step 37), and advances the processing to step 38. In step 37, the CPU core 21 stores the parent apparatus channel as a channel to be used by its own game apparatus and sets the self attribute Dg to the parent apparatus. The CPU core 21 sets group information of the group including its own game apparatus and describes the information in the group information Dc (at this point, only the GSN, the game name, the communication channel and the parent apparatus ID are described in the group information Dc). Then, the CPU core 21 starts transmitting a parent apparatus beacon frame. As the transmitter ID, the priority level and the re-scan cycle in the parent apparatus beacon frame, the self ID, the priority level Dh, and re-scan cycle Di are described. The group information Dc of the group including its own game apparatus (including the information on the child apparatus) may be described in the parent apparatus beacon frame and transmitted to other game apparatuses.

Then, the CPU core 21 determines whether or not a communication request frame (FIG. 7) has been received from another game apparatus 1 (step 38). When receiving a communication request frame and intending to issue a permission on the request, the CPU core 21 registers the transmitter ID of the communication request frame as a child apparatus in the group information Dc of its own group, describes the group information Dc in a communication permission frame representing the permission (FIG. 8), and transmits the communication permission frame with the addressee being set to the transmitter ID of the communication request frame (step 39). Then, the CPU core 21 advances the processing to step 40. When no communication request frame has been received, the CPU core 21 advances the processing to step 40 without executing any processing.

In step 40, the CPU core 21 determines whether or not child apparatuses which will participate in the wireless communication have been finalized. When such child apparatuses have been finalized, the CPU core 21 advances the processing to step 41. When no such child apparatuses have been finalized, the CPU core 21 returns the processing to step 38 for repeating the above-described processing. Specifically in step 40, it is determined whether or not a maximum number of child apparatuses which can participate in the communication game have participated, or whether or not a minimum number of child apparatuses which is necessary for the communication game have participated and the player of the parent apparatus (or one of the child apparatuses which have participated) has instructed to finalize the game apparatuses which will participate.

In step 41, the CPU core 21 determines whether or not to play the communication game by causing the game program GP stored on the memory card 17 mounted on its own game apparatus to be downloaded to the child apparatuses. When the game program GP is to be downloaded, the CPU core 21 causes the game program GP to be download to the child apparatuses included in the same group (or causes the game program GP to be downloaded to the child apparatuses which requested the game program GP, among the child apparatuses included in the same group) (step 42), and advances the processing to step 43. When the communication game is to be played using the game program GP stored on the memory card 17 mounted on each game apparatus 1, the CPU core 21 advances the processing to step 43 without executing any processing.

As described above regarding step 34, the game apparatus 1 may be set as the parent apparatus when it is selected to play the communication game. Alternatively, when it is selected to play the communication game, the player may be allowed to select whether to play the communication game with or without the game program GP being downloaded, and the determination in step 41 may be made based on such a selection. This selection is not made in a parent apparatus which does not store a game program to be transmitted to the child apparatuses (a parent apparatus on which a memory card 17 without the game program is mounted).

In step 43, the CPU core 21 waits for a game start to be selected. The communication game among the parent apparatus and the child apparatuses is started by, for example, the player of the parent apparatus selecting the "game start" from the alternatives displayed on the screen of the first LCD 11 or the second LCD 12. The game start may be set to be selectable by the child apparatuses. When the game start is selected, the CPU core 21 communicates input information, game parameter information or the like with the child apparatuses in the same group and executes game processing based on the information obtained by the communication (step 44). Then, the CPU core 21 determines whether or not to terminate the game (step 45). The game is terminated when, for example, a condition for terminating the game (e.g., the parameter representing the stamina of the player character operated by its own game apparatus becomes zero) is fulfilled or the player has made an input to terminate the game. When the game is not to be terminated, the CPU core 21 returns the processing to step 44 for repeating the above-described processing. When the game is to be terminated, the CPU core 21 terminates the wireless communication (step 46) to return the self attribute Dg to the wait state. Thus, the processing in this flowchart is terminated.

As understood from the above, when a game apparatus 1 is to be set as the parent apparatus, whether or not the game apparatus 1 can be set as the parent apparatus is determined, and the channel usable for the parent apparatus is determined, based on the priority level of the wireless communication and the radio wave use ratio of the channel. Specifically, when there is at least one channel having a priority level lower than the priority level of such a game apparatus 1, the channel having the lowest ratio wave use ratio among the channels having such a priority level is allocated. When no one channel has a priority level lower than the priority level of such a game apparatus 1 but there is at least one channel having a priority level equal to the priority level of such a game apparatus 1, the channel having the lowest ratio wave use ratio among the channels having such a priority level is allocated. When no channel has a priority level equal to or lower than the priority level of such a game apparatus 1, the channel having the lowest ratio wave use ratio among the channels having a priority level which is not "3" and having a ratio wave use ratio which is lower than U % is allocated.

In other words, in the channel used by a parent apparatus having a priority level of "3", no game apparatus 1 having a priority level of "0" through "2" newly starts a communication. Thus, the channel used by the parent apparatus having the priority level of "3" is protected from being jammed with other wireless communications. A parent apparatus having a relatively high priority level is allocated to a channel having a lower radio wave use ratio, with priority. A parent apparatus having a relatively high priority level is allocated to each channel with priority, and a parent apparatus having a relatively low priority level is prevented from being allocated to a busy channel. In this manner, a parent apparatus having a relatively high priority level communicates with other apparatuses with priority while the channel is protected from being jammed.

The following variations are conceivable.
A channel having a priority level higher than its own priority level may be made unusable regardless of the radio wave use ratio.
Even a channel having a priority level of "3" may be made usable if having a radio wave use ratio equal to or lower than a predetermined level.
A channel having the lowest radio wave use ratio may be selected among the channels having a priority level equal to or lower than its own priority level.
A channel having the lowest priority level may be selected among the channels having a priority level lower than (or equal to or lower than) its own priority level.

Returning to FIG. 12, when the game apparatus 1 is to communicate as a child apparatus (No in step 34), the CPU core 21 executes child apparatus communication start processing (step 47) and advances the processing to the next step. Hereinafter, with reference to FIG. 14, the child parent apparatus communication start processing will be described in detail.

Referring to FIG. 14, the CPU core 21 determines whether or not to download the game program GP managed by the parent apparatus to its own game apparatus (step 80). When the game program GP in the parent apparatus is to be downloaded, the CPU core 21 advances the processing to step 86. When the communication game is to be played using the game program GP managed by each game apparatus 1, and further the memory card 17 is mounted on the game apparatus 1 (Yes in step 81), the CPU core 21 advances the processing to step 82. Such selections are specifically made in accordance with the operation performed by the player using the menu screen.

In step 82, the CPU core 21 starts a program in the memory card 17, such as a game program or the like. Then, the CPU core 21 executes channel scan processing for each of the channels (channels Ch1, Ch7 and Ch13) (step 83). The CPU core 21 displays a list of communicable parent apparatuses on the screen of the first LCD 11 or the second LCD 12 (step 84), and advances the processing to step 85. The channel scan processing in step 83 is substantially the same as that described above regarding step 64, and will not be repeated here. In step 84, the list of parent apparatuses are displayed based on the channel scan information De and the group information Dc, Dd, . . . updated in step 83. In the list, all the parent apparatuses are displayed regardless of the channel.

When the communication game is to be played based on the game program GP stored on the memory card 17 mounted on each game apparatus 1, the same multi-play game is played among the plurality of game apparatuses 1 in general. When the memory card 17 is mounted on the game apparatus 1, the game program stored on the memory card 17 is executed. Therefore, in step 84, only the parent apparatuses having a GSN communicable with the game program stored on the memory card 17 may be displayed.

Then, the CPU core 21 determines whether or not the player has selected a parent apparatus to which a communication request is to be transmitted, among the list of parent apparatuses (step 85). When the player has selected a parent apparatus to which a communication request is to be transmitted, the CPU core 21 advances the processing to step 90. When the player has not selected any parent apparatus, the CPU core 21 returns the processing to step 83 for repeating the above-described processing.

When the game program GP in the parent apparatus is to be downloaded, the CPU core 21 starts a built-in program stored on the memory means of the game apparatus 1 (step 86). Then, the CPU core 21 executes the channel scan processing for each of the channels (step 87). The CPU core 21 displays a list of parent apparatuses from which the game program GP can be downloaded on the screen of the first LCD 11 or the second LCD 12 (step 88), and advances the processing to step 89. Although not shown, the parent apparatus beacon frame additionally includes information for identifying whether this parent apparatus corresponds to downloading (it has been selected to download the game program from this parent apparatus to the child apparatuses for playing the communication game) or not (it has been selected to play the communication game without downloading the game program from this parent apparatus). Based on this information, only the parent apparatuses corresponding to downloading are displayed. The channel scan processing in step 87 is substantially the same as that described above regarding step 64, and will not be repeated here. In step 88, the list of parent apparatuses corresponding to downloading are displayed for each channel, based on the channel scan information De and the group information Dc, Dd, . . . updated in step 87.

The CPU core 21 determines whether or not the player has selected a parent apparatus to which a communication request is to be transmitted, among the list of parent apparatuses (step 89). When the player has selected a parent apparatus to which a communication request is to be transmitted, the CPU core 21 advances the processing to step 90. When the player has not selected any parent apparatus, the CPU core 21 returns the processing to step 87 for repeating the above-described processing.

In step 90, the CPU core 21 refers to the parent apparatus priority level PLV described in the channel scan information De regarding the parent apparatus selected in step 85 or step 89, and to the channel priority level ChLV of the channel used by the parent apparatus, to determine whether or not the channel priority level ChLV is equal to the parent apparatus priority level PLV. When ChLV=PLV, the CPU core 21 advances the processing to step 91. When ChLV>PLV, the CPU core 21 advances the processing to step 94.

In step 91, the CPU core 21 transmits a communication request frame (FIG. 7) to the parent apparatus selected in step 85 or step 89. Then, the CPU core 21 waits for a communication permission frame (FIG. 8; step 39) to be transmitted from the selected parent apparatus (step 92). When receiving the communication permission frame, the CPU core 21 updates the group information Dc of its own group based on the data described in the communication permission frame, and sets the self attribute Dg to the child apparatus. Thus, the CPU core 21 starts a communication with the parent apparatus to which the communication request frame was transmitted (step 93). Then, the CPU core 21 terminates the processing in this subroutine.

In step 94 (i.e., ChLV>PLV), the CPU core 21 determines whether or not the channel priority level ChLV is "3". When the channel priority level ChLV is "3", the CPU core 21 advances the processing to step 97. When the channel priority level ChLV is lower than "3", the CPU core 21 advances the processing to step 95.

In step 95, the CPU core 21 measures the radio wave use ratio of the channel used by the selected parent apparatus to update the radio wave use ratio measurement data Dj. The radio wave use ratio is measured in substantially the same manner as in step 65 and will not be described here in detail. Then, the CPU core 21 determines whether or not the radio wave use ratio measured in step 95 is equal to or higher than U % (step 96). When the radio wave use ratio measured in step 95 is lower than U % (No in step 96), the CPU core 21 advances the processing to step 91. When the radio wave use ratio measured in step 95 is equal to or higher than U % (Yes in step 96), the CPU core 21 advances the processing to step 97.

In step 97, the CPU core 21 determines that the wireless communication with the parent apparatus selected in step 85 or step 87 is impermissible and notifies the player of the game apparatus 1 of such a determination (e.g., displays such a determination on the second LCD 12). Then, the CPU core 21 makes substantially the same determination as that in step 80 (step 98). When the determination result in step 98 is positive, the CPU core 21 returns the processing to step 87 for repeating the above-described processing. When the determination result in step 98 is negative, the CPU core 21 returns the processing to step 83 for repeating the above-described processing. Although not shown, a cancel by the operation of the player may be accepted. In this case, when a cancel is input, the processing is advanced to step 33.

Returning to FIG. 12, after the child apparatus communication start processing, when the game program GP is to be downloaded from the parent apparatus (Yes in step 48), the CPU core 21 downloads the game program GP from the parent apparatus (step 49), and advances the processing to step 50. When the game program GP is not to be downloaded from the parent apparatus (No in step 48), the CPU core 21 advances the processing to step 50 without executing any processing. In step 49, the game program GP may be stored on volatile storage means of the game apparatus 1.

In step 50, the CPU core 21 determines whether or not to play a communication game. When the communication game is to be played with the parent apparatus, the CPU core 21 advances the processing to step 51. When the communication game is not to be played with the parent apparatus (e.g., when the communication is terminated after the game program GP is downloaded from the parent apparatus), the CPU core 21 terminates the wireless communication (step 46), returns the self attribute Dg to the wait state, and terminates the processing in this flowchart.

In step 51, the CPU core 21 executes communication game processing or communication processing with the other game apparatuses 1 in the same group. Then, the CPU core 21 determines whether or not to terminate the game (step 52). When the game is not to be terminated, the CPU core 21 returns the processing to step 51 for repeating the above-described processing. When the game is to be terminated, the CPU core 21 terminates the wireless communication (step 46) to return the self attribute Dg to the wait state. Thus, the processing in this flowchart is terminated.

As understood from the above, when a game apparatus 1 is to be set as the child apparatus, it is determined whether or not the communication request to the parent apparatus is permitted, based on the priority level of the parent apparatus and the radio wave use ratio of the channel. Specifically, when the parent apparatus to which the communication request was transmitted has the highest priority level in the channel used by the parent apparatus, the communication request is permitted. When the channel used by the parent apparatus to which the communication request was transmitted is being used by another parent apparatus having a higher priority level, the communication request is permitted only when the priority level of the another parent apparatus is not "3" and further the radio wave use ratio of the channel is lower than U %.

In other words, when the channel used by a parent apparatus having a priority level of "3" is also used by a parent apparatus having a priority level of "0" through "2", a communication request to the parent apparatus having the priority level of "3" is permitted, but communication request to the parent apparatus having the priority level of "0" through "2" is not permitted. Thus, the channel used by the parent apparatus having the priority level of "3" is protected from being jammed with other wireless communications. For a channel which is not used by a parent having a priority level of "3", a communication request to a parent apparatus having the highest priority level in this channel is permitted, but a communication request to a parent apparatus having a relatively low priority level is only permitted when the radio wave use ratio of this channel is lower than U %. In this manner, a channel used by a parent apparatus having a relatively high priority level is protected from being jammed with a wireless communication having a relatively low priority level. Thus, by such settings regarding a child apparatus, a parent apparatus having a relatively high priority level can communicate with other apparatuses with priority while the channel is protected from being jammed.

The following variations are conceivable.

- A communication request to a parent apparatus other than the parent apparatus having the highest priority level in the channel may be made impermissible regardless of the radio wave use ratio.
- Even in a channel used by a parent apparatus having a priority level of "3", a communication request to a parent apparatus having a lower priority level may be made permissible when the radio wave use ratio is equal to or lower than a predetermined level.

As is clear from the above processing, once a communication request is transmitted from a child apparatus to a parent apparatus, the communication between the child apparatus and the parent apparatus is continued even if a parent apparatus having a higher priority level appears. Therefore, a wireless communication having a relatively low priority level is continued as conventionally done without being interrupted.

When a child apparatus transmits a communication request to a parent apparatus, the determination on the priority level may not be performed (i.e., the processing in steps 90 and 94 through 98 may not be executed). In this case, once a game apparatus is set as a parent apparatus, the communication with the parent apparatus is continued even if a parent apparatus having a higher priority level appears.

Now, with reference to FIG. 15, a wireless distribution operation of an information processing apparatus which is dedicated to distribution (e.g., the distribution parent apparatus 1PP in FIG. 4, a general personal computer, a dedicated wireless distribution apparatus, etc.) performed by executing the wireless communication program will be described. Referring to FIG. 15, when the power of the game apparatus 1 is turned on, the CPU core 21 executes a boot program to load a wireless communication program CP stored on the memory card 17 or built in the game apparatus 1 onto the RAM 24 (step 101). The loaded wireless communication program is executed by the CPU core 21, and thus the steps shown in FIG. 15 are executed.

The CPU core 21 executes the initialization processing (step 102) for the wireless communication processing, sets the self priority level and describes the self priority level as the priority level Dh (step 103). Then, the CPU core 21 advances the processing to step 104. The initialization processing in step 102 is substantially the same as that described above regarding step 32 and will not be described here in detail. The priority level setting in step 103 is substantially the same as that described above regarding step 35 except the following. The self priority level may be set in the built-in memory of the dedicated distribution apparatus or in the program executed by the dedicated distribution apparatus. When a wireless communication by which the dedicated distribution apparatus transmits the game program or data to the other apparatuses is set to have a higher priority level than the other wireless communications, such a wireless communication is set to a priority level "3" in step 103.

Then, CPU core 21 executes parent apparatus communication start processing (step 104), sets its own game apparatus as the parent apparatus in the parent apparatus channel (step 105), and starts transmitting a beacon frame substantially the same as the parent apparatus beacon frame described above. The parent apparatus communication start processing in step 104 is substantially the same as that described above regarding step 36 (FIG. 13) and will not described here in detail. The processing of setting its own game apparatus as the parent apparatus in the parent apparatus channel in step 105 is substantially the same as that described above regarding step 37 and will not described here in detail. The processing in step 104 or 105 may be omitted. Namely, the dedicated distribution apparatus may be set to be capable of transmitting a parent apparatus beacon frame regardless of the priority levels of the other parent apparatuses or other dedicated distribution apparatuses.

The CPU core 21 waits for its own game apparatus to receive a communication request (communication request frame) from a game apparatus 1 (step 106). When its own game apparatus receives a communication request frame (Yes in step 106) and intends to permit the distribution to the game apparatus 1 which transmitted the communication request frame, the CPU core 21 registers the transmitter ID of the communication request frame as a child apparatus in the group information Dc of its own group, describes the group information Dc in a communication permission frame representing the permission, and transmits the communication permission frame with the addressee being set to the transmitter ID of the communication request frame (step 107). Then, the CPU core 21 distributes (transmits) the game program or data to the child apparatus to which the communication permission frame was transmitted (step 108), and returns the processing to step 106 for repeating the above-described processing.

As understood from the above, also with a dedicated distribution apparatus, whether or not the game apparatus 1 can be set as the parent apparatus is determined, and the channel usable by the parent apparatus is determined, based on the priority level and the radio wave use ratio of the channel. When the dedicated distribution apparatus is set as a parent apparatus having a priority level of "3", another parent apparatus having a priority level of "0" through "2" is not newly set for the channel used by the dedicated distribution apparatus. Thus, the channel is protected from being jammed with other wireless communications.

In the above described wireless communication system, the wireless communication is performed among a plurality of game apparatuses 1. Alternatively, the wireless communication system may include an apparatus which is different from the game apparatus 1. For example, instead of the game apparatus 1PP shown in FIG. 4, a radio wave relay station acting as an access point for a wireless LAN may be provided. In this case, a game program may be wirelessly distributed from the radio wave relay station to the game apparatuses 1C3 and 1C4. Still alternatively, instead of the game apparatus 1PP shown in FIG. 4, an information processing apparatus having a wireless transmission and receiving function may be provided. In this case, a game program may be wirelessly distributed from the information processing apparatus to the game apparatuses 1C3 and 1C4. In such a system, a list of parent apparatuses, displayed on the screen of the game apparatus 1 which received a parent apparatus beacon frame, includes an apparatus which is different from the game apparatus 1. Even such an apparatus may be displayed in the list regardless of the type of parent apparatus.

The wireless communication system may include a conventional game apparatus without the priority level being set. For example, when a conventional game apparatus is set as a parent apparatus as described above, such a parent apparatus is treated as having the lowest priority level (parent apparatus priority level PLV="0"), by the game apparatuses according to certain exemplary embodiments which transmits a communication request to the parent apparatus. In the case where the channel used by such a parent apparatus has another parent apparatus having a higher priority level, a communication request cannot be transmitted from the child apparatus according to certain exemplary embodiments to the parent apparatus of the conventional version, although the conventional apparatus can be a parent apparatus. As a result, wireless communication is not possible. Even when a conventional type of game apparatus is located in the wirelessly communicable area, a wireless communication having a higher priority level is prioritized and the channel used by such a wireless communication is protected from being jammed with the wireless communication between the conventional game apparatus and the game apparatus 1 according to certain exemplary embodiments.

In the above description, four priority levels of "0" through "3" are provided for the wireless communication. Alternatively, five or more levels or three or less levels may be provided. For example, the wireless communication may be classified into two priority levels of "0" and "1", and the priority level "1" maybe treated as the priority level "3" described above. The certain exemplary embodiments described herein are realized in substantially the same manner.

In the above description, the setting as a parent apparatus and a communication request from a child apparatus are restricted in accordance with the radio wave use ratio. The radio wave use ratio is one exemplary parameter representing the degree at which the channel is used, and is one example of the wireless communication use degree according to certain exemplary embodiments. Another parameter representing the degree at which the channel is used may be adopted to restrict the wireless communication. For example, as described above, in a parent apparatus beacon frame, group information including information regarding a child apparatus belonging to the group may be described. In this case, the number of parent apparatuses and child apparatuses which are using one channel may be obtained. Namely, the number of the child apparatuses using a channel may be set as the actual use ratio of the channel, and the settings on a parent apparatus and a communication request from a child apparatus may be restricted in accordance with such an actual use ratio. In this case, data representing the number of child apparatuses may be included in the group information.

Any of the following settings may be used.

After receiving a communication request from a child apparatus (Yes in step 38), the parent apparatus transmits a parent apparatus beacon frame with identification information A (not shown) representing that the communication game can be started.

After transmitting a communication permission (after step 39), the parent apparatus transmits a parent apparatus beacon frame with identification information A representing that the communication game can be started.

After the participating child apparatuses are finalized (Yes in step 40), the parent apparatus transmits a parent apparatus beacon frame with identification information A representing that the communication game can be started.

After the communication game is started (Yes in step 43), the parent apparatus transmits a parent apparatus beacon frame with identification information A representing that the communication game can be started.

A game apparatus 1 to be a parent apparatus (the determination on which in step 34 is Yes) may, when a parent apparatus beacon frame representing a higher priority level than its own priority level is transmitted to one channel but the parent apparatus beacon frame does not include the identification information A, make a determination on the priority level while ignoring the priority level represented by the parent apparatus beacon frame. A game apparatus 1 to transmit a communication request to a selected parent apparatus (the determination on which in step 85 or 89 is Yes) may, when the channel used by the selected parent apparatus has a parent apparatus beacon frame representing a higher priority level than that of the selected parent apparatus but the parent apparatus beacon frame does not include the identification information A, make a determination on the priority level while ignoring the priority level represented by the parent apparatus beacon frame.

In the above case, as in the above-described exemplary embodiment, the priority level represented by a beacon frame of a parent apparatus having a priority level of a predetermined level (e.g., "3") or higher may be taken into consideration when a determination on the priority level is made even if the parent apparatus beacon frame does not include the identification A.

In the above description, the wireless communication is restricted in accordance with the priority level and the radio wave use ratio. When it is not expected that any effect is provided by restricting the wireless communication in accordance with the radio wave use ratio, only the priority level may be used to restrict the wireless communication. As is clear from the above, a determination based on the radio wave use ratio is considered when the priority level is lower than the channel priority level. Therefore, in the case where the wireless communication is impermissible whenever the priority level is lower than the channel priority level, the restriction based on the radio wave use ratio is not necessary.

As is clear from the above, the cycle of the channel scan performed when a game apparatus 1 is set as a parent apparatus is determined to a cycle designated by the parent apparatus having the highest priority level in the channel. The reason is that the channel scan processing itself is wasted in many cases in a channel used by a parent apparatus having a high priority level. In the case where the channel scan cycle for a parent apparatus having a high priority level is set to be relatively long (e.g., no re-scan), the channel scan processing which becomes unnecessary for setting a parent apparatus having a low priority level can be omitted in order to simplify the communication start processing. In the case where the result of the channel scan processing performed when a game apparatus 1 is set as a child apparatus is stored and used when the game apparatus 1 is set as a parent apparatus, the time for the communication start processing is shortened. This is effective in a communication mode in which the parent apparatus and the child apparatus are frequently exchanged with each other (e.g., so-called "exchange communication" in which the parent apparatus and the child apparatus automatically communicate with each other by putting the other apparatus into a communication mode).

When a game apparatus 1 is set as a parent apparatus, the parent apparatus beacon frame representing the priority level is transmitted by broadcast at a cycle of a predetermined period. The parent apparatus beacon frame is also transmitted at a cycle of a predetermined period before the child apparatus is set, during the entry of a child apparatus, during data downloading, during a communication game, and various other states of wireless communication. Thus, regardless of the wireless communication state in which the parent apparatus is in, the existence of the parent apparatus and the priority level thereof can be notified to the other game apparatuses 1 located in the wirelessly communicable area. The term in which the priority level is described in the parent apparatus beacon frame may be a part of the term in which the game apparatus 1 is set as the parent apparatus. For example, a parent apparatus beacon frame including the priority level may be transmitted in at least one term selected from: a term after the game apparatus is set as a parent apparatus and receives a communication request from a child apparatus, a term after a communication permission is transmitted to a child apparatus, a term after the participating child apparatuses are finalized (term after the determination result in step 40 is Yes), a term after the start of a communication game is instructed (term after the determination result in step 43 is Yes), and the like.

In the above description, it is determined whether or not a game apparatus 1 can be set as a parent apparatus, based on the priority level. Then, it is determined whether or not the game apparatus 1 can transmit a communication request to the parent apparatus, again based on the priority level. Namely, the wireless communication by a plurality of apparatuses is made possible after two determinations are made based on the priority level. The wireless communication may be made possible at different timings based on the priority level. For example, when the parent apparatus receives a communication request, it may be determined whether or not the wireless communication is made possible based on the priority level of the parent apparatus. Alternatively, when a parent apparatus and a child apparatus wish to start a communication game, or when a distribution parent apparatus wishes to start a distribution to a child apparatus, it may be determined whether or not the communication game can be started or whether or not the distribution can be started, based on the priority level of the parent apparatus.

In the above description, information representing the priority level is described in the parent apparatus beacon frame representing the existence of a parent apparatus and transmitted by broadcast. Information representing the priority level may be transmitted in any other form. For example, information representing the priority level may be described in a transmission frame different from the parent apparatus beacon frame and transmitted by broadcast.

A parent apparatus beacon frame including the information representing the priority level may be transmitted in the same frequency band as, or in a different frequency band from, that of wireless communications for a communication game or data distribution performed among a plurality of game apparatuses.

In the above description, the game apparatuses 1 are mobile. A wireless communication program according to certain exemplary embodiments is applicable to an installment type game apparatus, a general personal computer, or any other information processing apparatus.

A wireless communication system according to certain exemplary embodiments can protect a wireless communication to be transmitted or received with priority from being made difficult, and is useful as, for example, a wireless communication system for performing wireless communication between a mobile game apparatus and a service providing apparatus, or a system for performing wireless communication among a plurality of mobile game apparatuses.

While certain exemplary embodiments have been described in detail, the foregoing description is in all aspects illustrative and not restrictive. It is understood that numerous other modifications and variations can be devised without departing from the certain exemplary embodiments described herein.

What is claimed is:

1. A wireless communication system including a plurality of mobile game apparatuses for wirelessly communicating with each other at a short distance and a service providing apparatus for wirelessly transmitting service data to the plurality of mobile game apparatuses at a short distance, wherein:

the service providing apparatus comprises:
a service data transmitter for wirelessly transmitting, at a short distance, first identification information, which is identification information of itself, to the mobile game apparatuses, receiving a communication request wirelessly transmitted at a short distance to itself from at least one of the mobile game apparatuses which received the first identification information, and wirelessly transmitting, at a short distance, the service data to the at least one mobile game apparatus; and
a priority control data transmitter for wirelessly transmitting, at a short distance, first priority control data indicating that a priority level of the short distance wireless transmission of the service data by itself is higher than a priority level of the short distance wireless communication among the mobile game apparatuses; and the mobile game apparatuses each comprises:

a first processor for wirelessly transmitting, at a short distance, second identification information, which is identification information of itself, receiving a communication request wirelessly transmitted at a short distance to itself from at least one of the other mobile game apparatuses which received the second identification information, and setting the at least one other mobile game apparatus as a communication counterpart;

a second processor for receiving the second identification information wirelessly transmitted at a short distance from at least one of the other mobile game apparatuses and thus confirming the at least one other mobile game apparatus located in a communicable area, wirelessly transmitting, at a short distance, the communication request to the at least one other mobile game apparatus represented by the received second identification information, and setting the at least one other mobile game apparatus as a communication counterpart;

a third processor for receiving the first identification information wirelessly transmitted at a short distance from the service providing apparatus and thus confirming the service providing apparatus located in the communicable area, wirelessly transmitting, at a short distance, the communication request to the service providing apparatus represented by the received first identification information, and receiving the service data from the service providing apparatus;

a priority control data receiver for attempting to receive the first priority control data;

determination programmed logic circuitry for determining whether or not the first priority control data has been received; and prohibition programmed logic circuitry for prohibiting the short distance wireless communication with the at least one other mobile game apparatus when the first priority control data has been received.

2. A wireless communication system according to claim 1, wherein when receiving the first priority control data, the prohibition programmed logic circuitry prohibits at least one of:

accepting a player input to start the first processor;
starting the first processor;
accepting a player input for allowing the first processor to transmit the second identification information;
allowing the first processor to transmit the second identification information;
allowing the first processor to receive the communication request;
allowing the first processor to transmit a communication permission to the at least other mobile game apparatus which is a transmitter of the communication request;
accepting a player input to start communication with the communication counterpart set by the first processor; and
starting communication with the communication counterpart set by the first processor; and
also prohibits at least one of:
accepting a player input to start the second processor;
starting the second processor;
allowing the second processor to receive the second identification information;
accepting a player input for allowing the second processor to transmit the communication request;
allowing the second processor to transmit the communication request;
accepting a player input for allowing the second processor to transmit a request to the at least one other mobile game apparatus to request a short distance wireless communication of the second identification information;
allowing the second processor to transmit the request to the at least one other mobile game apparatus to request the short distance wireless communication of the second identification information;
accepting a player input to start communication with the communication counterpart set by the second processor; and
starting communication with the communication counterpart set by the second processor.

3. A wireless communication system according to claim 1, wherein:

the second processor and the third processor are formed of one common processor for recognizing the service providing apparatus and the at least one other mobile game apparatus without distinguishing, and transmitting the communication request thereto; and the common processor receives the first identification information wirelessly transmitted at a short distance from the service providing apparatus and the second identification information wirelessly transmitted at a short distance from the at least one other mobile game apparatus, and thus confirms the service providing apparatus and the at least one other mobile game apparatus located in the communicable area; and wirelessly transmits, at a short distance, the communication request to the service providing apparatus represented by the received first identification information or to the at least one other mobile game apparatus represented by the received second identification information.

4. A wireless communication system according to claim 3, wherein:

the priority control data transmitter transmits, at a short distance, the first priority control data as attached to the first identification information transmitted by the service data transmitter;

the priority control data receiver receives the first identification information wirelessly transmitted at a short distance from the service providing apparatus to the common processor and the second identification information wirelessly transmitted at a short distance from the at least one other mobile game apparatus, and attempts to receive the first priority control data attached to the first identification information, and thus is included in the common processor; and when receiving the first priority control data, the prohibition programmed logic circuitry prohibits at least one selected from the group consisting of:

of accepting a player input to start the common processor;
starting the common processor;
allowing the common processor to receive the second identification information;
accepting a player input for allowing the common processor to transmit the communication request;
allowing the common processor to transmit the communication request;
accepting a player input for allowing the common processor to transmit a request to the at least one other mobile game apparatus to request a short distance wireless communication of the second identification information;

allowing the common processor to transmit the request to the at least one other mobile game apparatus to request the short distance wireless communication of the second identification information;

accepting a player input to start communication with the communication counterpart set by the common processor; and starting communication with the communication counterpart set by the common processor.

5. A wireless communication system according to claim 1, wherein:

each of the plurality of mobile game apparatuses further comprises an alternate repeater for alternately repeating the processing by the first processor and the processing by the second processor to set the at least one other mobile game apparatus as the communication counterpart; and when receiving the first priority control data, the prohibition programmed logic circuitry prohibits at least of:

accepting a player input to start the first processor;

starting the first processor;

accepting a player input for allowing the first processor to transmit the second identification information;

allowing the first processor to transmit the second identification information;

allowing the first processor to receive the communication request;

allowing the first processor to transmit a communication permission to the at least other mobile game apparatus which is a transmitter of the communication request;

accepting a player input to start communication with the communication counterpart set by the first processor; and starting communication with the communication counterpart set by the first processor.

6. A wireless communication system according to claim 1, wherein:

each of the plurality of mobile game apparatuses further comprises a second priority control data transmitter for wirelessly transmitting, at a short distance, second priority control data representing a priority level of the short distance wireless communication of itself in the first processor;

the priority control data receiver attempts to receive the first priority control data transmitted from the service providing apparatus and the second priority control data transmitted from the at least one other mobile game apparatus;

the determination programmed logic circuitry compares the priority level of the short distance wireless communication of itself, with the priority level represented by the second priority control data received by the priority control data receiver, and determines whether or not the priority level of the short distance wireless communication of itself is sufficiently high to fulfill a predetermined condition; and the prohibition programmed logic circuitry prohibits the short distance wireless communication with the at least one other mobile game apparatus when the result of determination made by the determination programmed logic circuitry using the second priority control data is negative or when the first priority control data is received.

7. A wireless communication system according to claim 6, wherein:

the priority control data receiver scans the first priority control data and the second priority control data currently transmitted at a predetermined frequency; and the determination programmed logic circuitry compares the priority level of the short distance wireless communication of itself, with the highest priority level among the priority levels represented by the first priority control data and the second priority control data received by the scanning.

8. A wireless communication system according to claim 1, wherein:

the plurality of mobile game apparatuses wirelessly communicate data for a mutual short distance wireless communication using a channel selected from a plurality of channels;

the priority control data receiver attempts to receive the first priority control data in each of the plurality of channels;

the first processor transmits the second identification information using a channel not used for receiving the first priority control data, among the plurality of channels; and the plurality of mobile game apparatuses mutually perform the short distance wireless communication using the channel used for transmitting the second identification information.

9. A wireless communication system according to claim 8, wherein:

each of the plurality of mobile game apparatuses further comprises actual use degree measurement programmed logic circuitry for measuring a wireless communication use degree of each of the plurality of channels; and the first processor transmits the second identification information using a channel having the lowest wireless communication use degree, among the channels not used for receiving the first priority control data.

10. A wireless communication system according to claim 1, wherein the priority control data receiver does not attempt to receive the first priority control data after starting a communication with the communication counterpart set by the first processor or the second processor.

11. A wireless communication system according to claim 1, wherein:

the priority control data transmitter transmits, together with the first priority control data, next receiving timing data designating the next timing for attempting to receive the first priority control data; and when receiving the first priority control data, the priority control data receiver attempts to receive the first priority control data again at the timing designated by the next receiving timing data transmitted together with the first priority control data.

12. A wireless communication system according to claim 1, wherein:

the priority control data transmitter wirelessly transmits, at a short distance, the first priority control data using a channel selected among the plurality of channels for wirelessly transmitting, at a short distance, the service data;

the priority control data receiver attempts to receive the first priority control data in each of the plurality of channels;

the first processor transmits the second identification information using a channel not used for receiving the first priority control data, among the plurality of channels; and the plurality of mobile game apparatuses mutually perform the short distance wireless communication using the channel used for transmitting the second identification information.

13. A wireless communication system according to claim 12, wherein:
   each of the plurality of mobile game apparatuses further comprises actual use degree measurement programmed logic circuitry for measuring a wireless communication use degree of each of the plurality of channels; and
   the first processor transmits the second identification information using a channel having the lowest wireless communication use degree, among the channels not used for receiving the first priority control data.

14. A wireless communication system according to claim 6, wherein:
   each of the plurality of mobile game apparatuses further comprises radio wave use ratio measurement programmed logic circuitry for measuring a radio wave use ratio of the channel used for the short distance wireless transmission; and
   the prohibition programmed logic circuitry prohibits the short distance wireless communication with the at least one other mobile game apparatus regardless of the result of measurement by the radio wave use ratio measurement programmed logic circuitry when the priority control data receiver receives the first priority control data, and does not prohibit the short distance wireless communication with the at least one other mobile game apparatus when the result of determination made by the determination programmed logic circuitry using the second priority control data is negative but the radio wave use ratio measured by the radio wave use ratio measurement programmed logic circuitry is equal to or lower than a predetermined threshold.

15. A wireless communication system including a plurality of mobile game apparatuses for wirelessly communicating with each other at a short distance, each of the plurality of mobile game apparatuses comprising:
   a first processor for wirelessly transmitting, at a short distance, identification information, which is identification information of itself, receiving a communication request wirelessly transmitted at a short distance to itself from at least one of the other mobile game apparatuses which received the identification information, and setting the at least one other mobile game apparatus as a communication counterpart;
   a second processor for receiving the identification information wirelessly transmitted at a short distance from at least one of the other mobile game apparatuses and thus confirming the at least one other mobile game apparatus located in a communicable area, wirelessly transmitting, at a short distance, the communication request to the at least one other mobile game apparatus represented by the received identification information, and setting the at least one other mobile game apparatus as a communication counterpart;
   a priority control data transmitter for wirelessly transmitting, at a short distance, priority control data representing a priority level of the short distance wireless communication of itself;
   a priority control data receiver for attempting to receive the priority control data;
   determination programmed logic circuitry for comparing the priority level of the short distance wireless communication of itself, with a priority level represented by the priority control data received by the priority control data receiver, and determining whether or not the priority level of the short distance wireless communication of itself is sufficiently high to fulfill a predetermined condition; and
   prohibition programmed logic circuitry for prohibiting the short distance wireless communication with the at least one other mobile game apparatus when the result of determination made by the determination programmed logic circuitry is negative.

16. A wireless communication system according to claim 15, wherein when the result of determination made by the determination programmed logic circuitry is negative, the prohibition programmed logic circuitry prohibits at least one of:
   accepting a player input to start the first processor;
   starting the first processor;
   accepting a player input for allowing the first processor to transmit the identification information;
   allowing the first processor to transmit the identification information;
   allowing the first processor to receive the communication request;
   allowing the first processor to transmit a communication permission to the at least other mobile game apparatus which is a transmitter of the communication request;
   accepting a player input to start communication with the communication counterpart set by the first processor; and
   starting communication with the communication counterpart set by the first processor; and
   also prohibits at least one of:
   accepting a player input to start the second processor;
   starting the second processor;
   allowing the second processor to receive the identification information;
   accepting a player input for allowing the second processor to transmit the communication request;
   allowing the second processor to transmit the communication request;
   accepting a player input for allowing the second processor to transmit a request to the at least one other mobile game apparatus to request a short distance wireless communication of the identification information;
   allowing the second processor to transmit the request to the at least one other mobile game apparatus to request the short distance wireless communication of the identification information;
   accepting a player input to start communication with the communication counterpart set by the second processor; and
   starting communication with the communication counterpart set by the second processor.

17. A wireless communication system according to claim 15, wherein:
   the priority control data transmitter transmits, at a short distance, the priority control data as attached to the identification information transmitted by the first processor;
   the priority control data receiver receives the identification information wirelessly transmitted at a short distance from the at least one other mobile game apparatus to the second processor, and attempts to receive the priority control data attached to the identification information, and thus is included in the second processor; and when the result of determination made by the determination programmed logic circuitry is negative, the prohibition programmed logic circuitry prohibits at least one of:

accepting a player input to start the second processor;

starting the second processor;

allowing the second processor to receive the identification information;

accepting a player input for allowing the second processor to transmit the communication request;

allowing the second processor to transmit the communication request;

accepting a player input for allowing the second processor to transmit a request to the at least one other mobile game apparatus to request a short distance wireless communication of the identification information;

allowing the second processor to transmit the request to the at least one other mobile game apparatus to request the short distance wireless communication of the identification information;

accepting a player input to start communication with the communication counterpart set by the second processor; and starting communication with the communication counterpart set by the second processor.

18. A wireless communication system according to claim 15, wherein:

each of the plurality of mobile game apparatuses further comprises an alternate repeater for alternately repeating the processing by the first processor and the processing by the second processor to set the at least one other mobile game apparatus as the communication counterpart; and when the result of determination made by the determination programmed logic circuitry is negative, the prohibition programmed logic circuitry prohibits at least one of:

accepting a player input to start the first processor;

starting the first processor;

accepting a player input for allowing the first processor to transmit the identification information;

allowing the first processor to transmit the identification information;

allowing the first processor to receive the communication request;

allowing the first processor to transmit a communication permission to the at least other mobile game apparatus which is a transmitter of the communication request;

accepting a player input to start communication with the communication counterpart set by the first processor; and starting communication with the communication counterpart set by the first processor.

19. A wireless communication system according to claim 15, wherein the priority control data receiver does not attempt to receive the priority control data after starting a communication with the communication counterpart set by the first processor or the second processor.

20. A wireless communication system according to claim 15, wherein:

the priority control data receiver scans the priority control data currently transmitted at a predetermined frequency; and the determination programmed logic circuitry compares the priority level of the short distance wireless communication of itself, with the highest priority level among the priority levels represented by the priority control data received by the scanning.

21. A wireless communication system according to claim 15, wherein:

the priority control data transmitter transmits, together with the priority control data, next receiving timing data designating the next timing for attempting to receive the priority control data; and when receiving the priority control data, the priority control data receiver attempts to receive the priority control data again at the timing designated by the next receiving timing data transmitted together with the priority control data.

22. A wireless communication system according to claim 15, wherein:

the priority control data transmitter wirelessly transmits, at a short distance, the priority control data using a channel selected, among the plurality of channels, for performing a short distance wireless communication with the at least one other mobile game apparatus;

the priority control data receiver attempts to receive the priority control data in each of the plurality of channels;

the first processor transmits the identification information using a channel for which the short distance wireless communication of itself is determined to have a priority level sufficiently high to fulfill the predetermined condition, among the plurality of channels; and the plurality of mobile game apparatuses mutually perform the short distance wireless communication using the channel used for transmitting the identification information.

23. A wireless communication system according to claim 15, wherein:

each of the plurality of mobile game apparatuses further comprises actual use degree measurement programmed logic circuitry for measuring a wireless communication use degree of each of the plurality of channels; and the first processor transmits the identification information using a channel having the lowest wireless communication use degree among the channels for which the short distance wireless communication of itself is determined to have a priority level sufficiently high to fulfill the predetermined condition.

24. A wireless communication system according to claim 15, wherein:

the plurality of mobile game apparatuses wirelessly communicate data for a mutual short distance wireless communication using a channel selected from a plurality of channels;

the priority control data receiver attempts to receive the priority control data in each of the plurality of channels;

the first processor transmits the identification information using a channel for which the short distance wireless communication of itself is determined to have a priority level sufficiently high to fulfill the predetermined condition, among the plurality of channels; and the plurality of mobile game apparatuses mutually perform the short distance wireless communication using the channel used for transmitting the identification information.

25. A wireless communication system according to claim 24, wherein:

each of the plurality of mobile game apparatuses further comprises actual use degree measurement programmed logic circuitry for measuring a wireless communication use degree of each of the plurality of channels; and the first processor transmits the identification information using a channel having the lowest wireless communication use degree among the channels for which the short distance wireless communication of itself is determined to have a priority level sufficiently high to fulfill the predetermined condition.

26. A wireless communication system according to claim 15, wherein:

each of the plurality of mobile game apparatuses further comprises radio wave use ratio measurement programmed logic circuitry for measuring a radio wave use ratio of the channel used for the short distance wireless communication; and even when the result of determination made by the determination programmed logic circuitry is negative, the prohibition programmed logic circuitry does not prohibit the short distance wireless communication with the at least one other mobile game apparatus if the radio wave use ratio measured by the radio wave use ratio measurement programmed logic circuitry is equal to or lower than a predetermined threshold.

27. A wireless communication system including a plurality of mobile game apparatuses for wirelessly communicating with each other at a short distance, each of the plurality of mobile game apparatuses comprising:

a first processor for wirelessly transmitting, at a short distance, identification information, which is identification information of itself, together with priority control data representing a priority level of the short distance wireless communication of itself, receiving a communication request wirelessly transmitted at a short distance to itself from at least one of the other mobile game apparatuses which received the identification information, and setting the at least one other mobile game apparatus as a communication counterpart; and a second processor for receiving the identification information and the priority control data wirelessly transmitted at a short distance from at least one of the other mobile game apparatuses and thus confirming the at least one other mobile game apparatus located in a communicable area, wirelessly transmitting, at a short distance, the communication request to the at least one other mobile game apparatus represented by the received identification information, and setting the at least one other mobile game apparatus as a communication counterpart;

wherein the second processor compares a communication request addressee priority level, which is a priority level represented by the priority control data transmitted from the mobile game apparatus which is an addressee of the communication request, with a priority level represented by the priority control data transmitted from another mobile game apparatus located in the communicable area, determines whether or not the communication request addressee priority level is sufficiently high to fulfill a predetermined condition, and when the result of determination is negative, prohibits the short distance wireless communication with the mobile game apparatus which is the addressee of the communication request.

* * * * *